US008560467B2

(12) United States Patent
Ito et al.

(10) Patent No.: US 8,560,467 B2
(45) Date of Patent: Oct. 15, 2013

(54) APPARATUS, METHOD, AND PROGRAM FOR PREDICTING USER ACTIVITY STATE THROUGH DATA PROCESSING

(75) Inventors: Masato Ito, Tokyo (JP); Kohtaro Sabe, Tokyo (JP); Hirotaka Suzuki, Kanagawa (JP); Jun Yokono, Tokyo (JP); Kazumi Aoyama, Saitama (JP); Takashi Hasuo, Tokyo (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 12/839,321

(22) Filed: Jul. 19, 2010

(65) Prior Publication Data

US 2011/0029465 A1 Feb. 3, 2011

(30) Foreign Application Priority Data

Aug. 3, 2009 (JP) ................. P2009-180780

(51) Int. Cl.
*G06F 15/18* (2006.01)
(52) U.S. Cl.
USPC .......................................... 706/12
(58) Field of Classification Search
None
See application file for complete search history.

(56) References Cited

FOREIGN PATENT DOCUMENTS

| JP | 2006-134080 | 5/2006 |
| JP | 2007-328435 | 12/2007 |
| JP | 2008-204040 | 9/2008 |

OTHER PUBLICATIONS

'Learning behavior—selection by emotions and cognition in a multi-goal task': Gadanho, 2003, Journal of machine learning research 4(2003) 385-412.*

'Influence modeling of complex stochastic processes': Dong, 2004 Massachusetts Institute of Technology.*
'A review of smart homes—present state and futire challenges': Chan, 2008, Computer methods and programs in biomedicine 91, pp. 55-81.*
Clarkson, "Life Patterns: Structure From Wearable Sensors," Thesis, Doctor of Philosophy in Media Arts and Sciences, Massachusetts Institute of Technology, pp. 1-3,5-130. (2002).
Japanese Office Action for Japanese Patent Application No. 2009-180780 dated Jul. 9, 2009.
D. J. Patterson, et al., Inferring High-Level Behavior from Low-Level Sensors, UbiComp 2003, LNCS 2864, pp. 73-89, Springer-Verlag, Berlin, Heidelberg.
B. Clarkson, et al., Recognizing User Context via Wearable Sensors, 2000, IEEE 0-7-695-0795-6/00.

* cited by examiner

*Primary Examiner* — Kakali Chaki
*Assistant Examiner* — Peter Coughlan
(74) *Attorney, Agent, or Firm* — Finnegan, Henderson, Farabow, Garrett & Dunner, L.L.P.

(57) ABSTRACT

A data processing apparatus includes an obtaining unit for obtaining time-series data, an activity model learning unit for learning an activity model representing a user activity state as a stochastic state transition model from the obtained time-series data, a recognition unit for recognizing a current user activity state by using the learned activity model, and a prediction unit for predicting a user activity state after a predetermined time elapses from a current time from the recognized current user activity state, wherein the prediction unit predicts the user activity state as an occurrence probability, and calculates the occurrence probabilities of the respective states on the basis of the state transition probability of the stochastic state transition model to predict the user activity state, while it is presumed that observation probabilities of the respective states at the respective times of the stochastic state transition model are an equal probability.

9 Claims, 20 Drawing Sheets

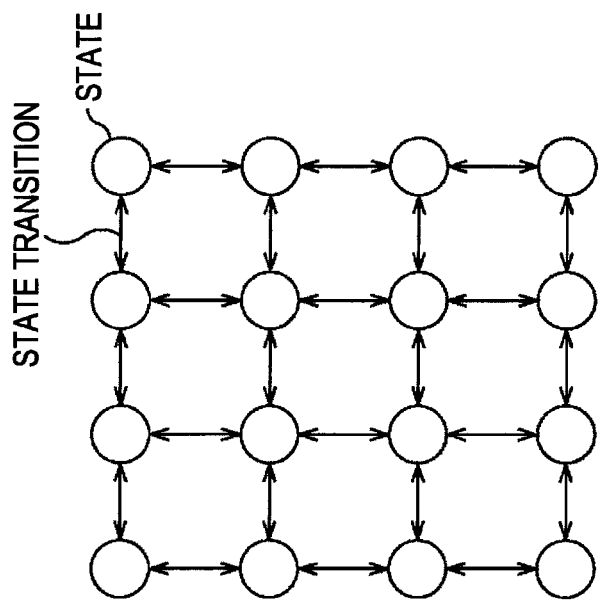
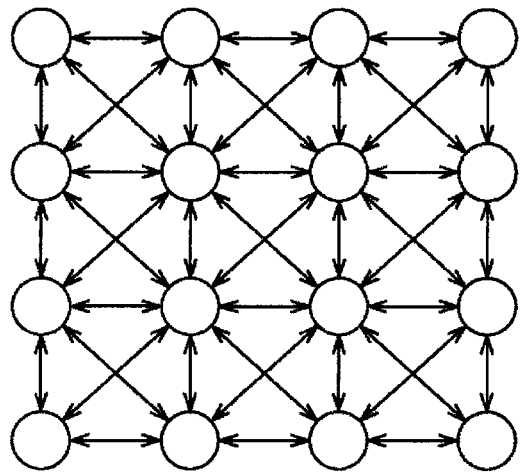

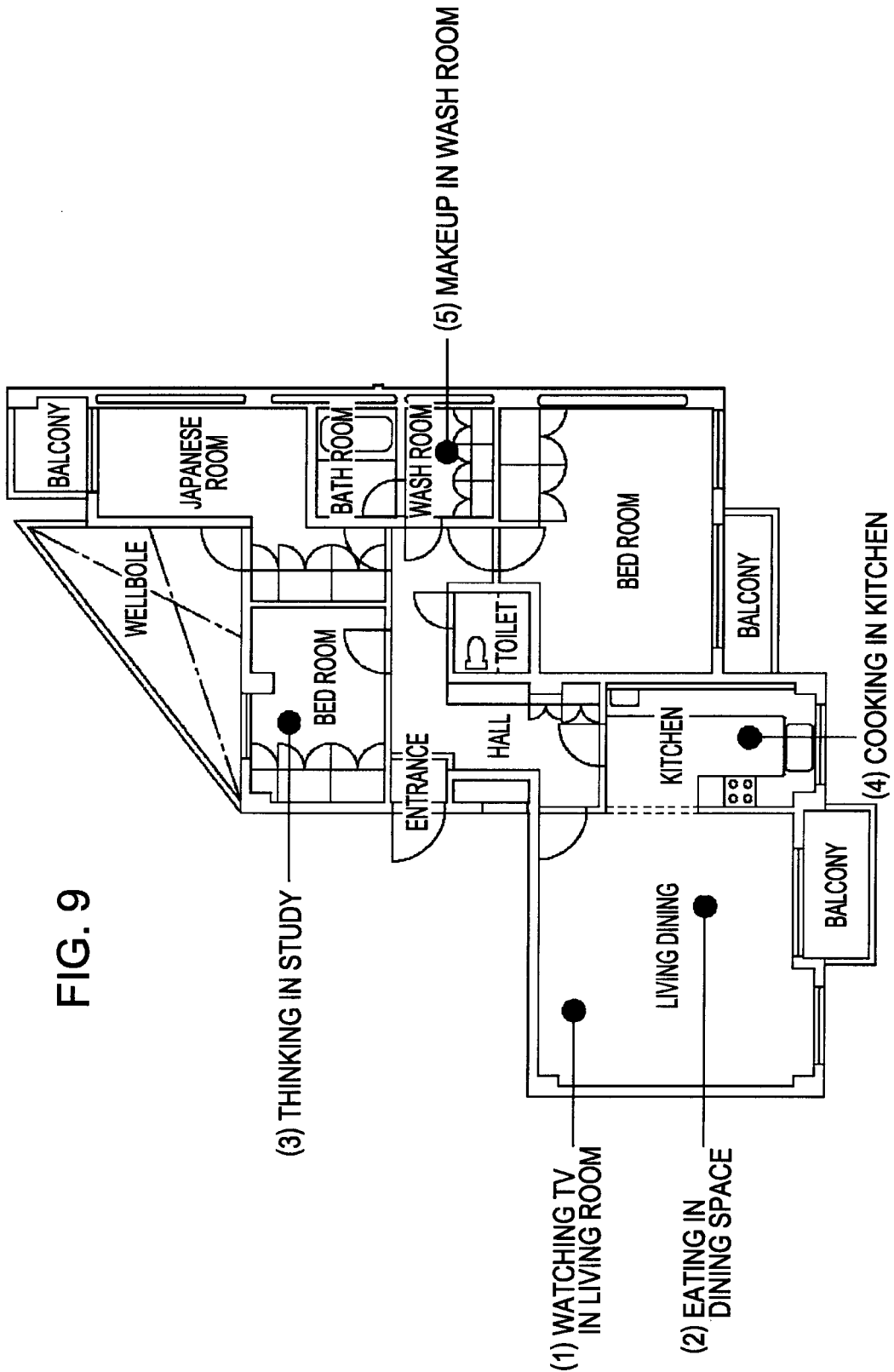

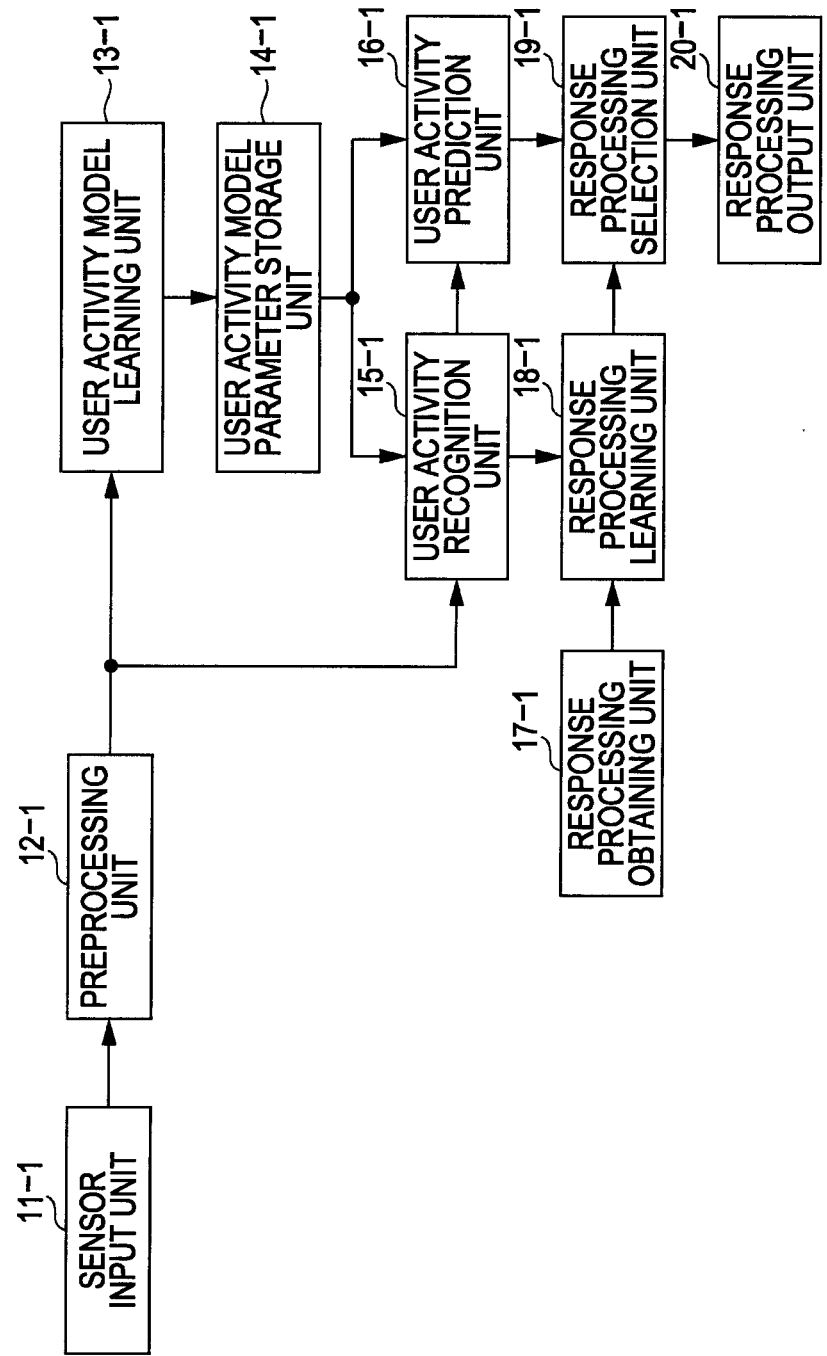

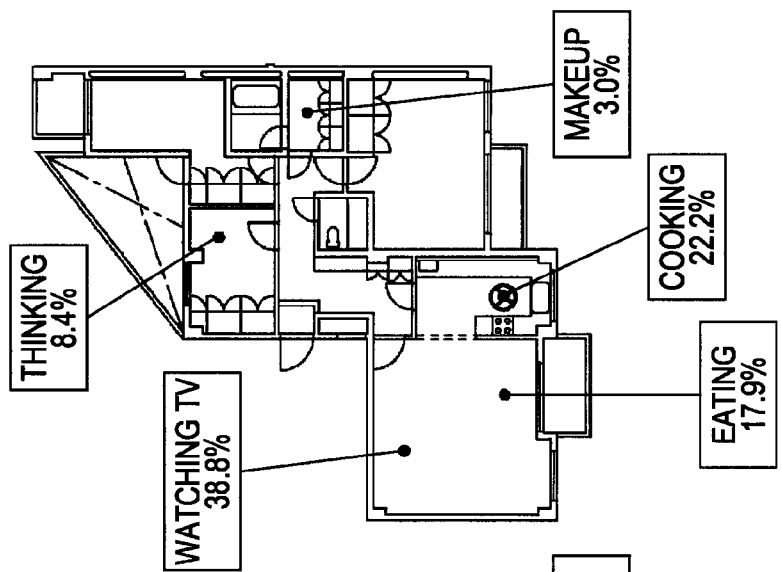
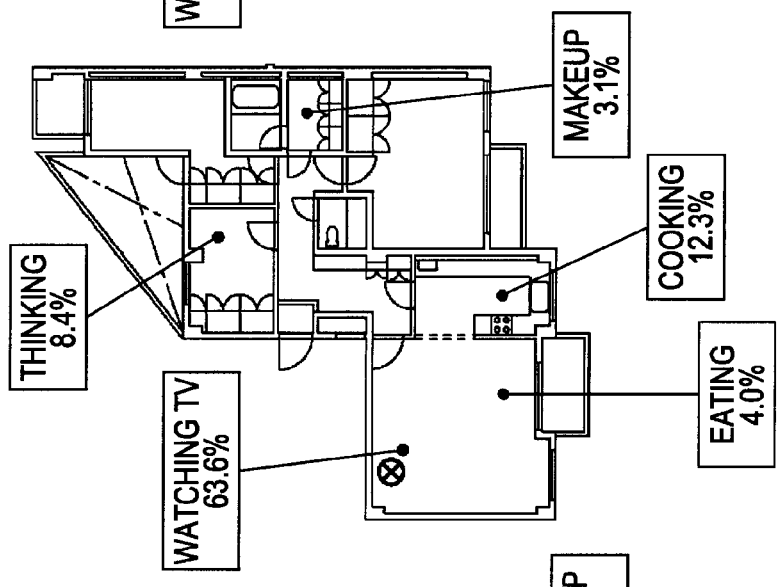
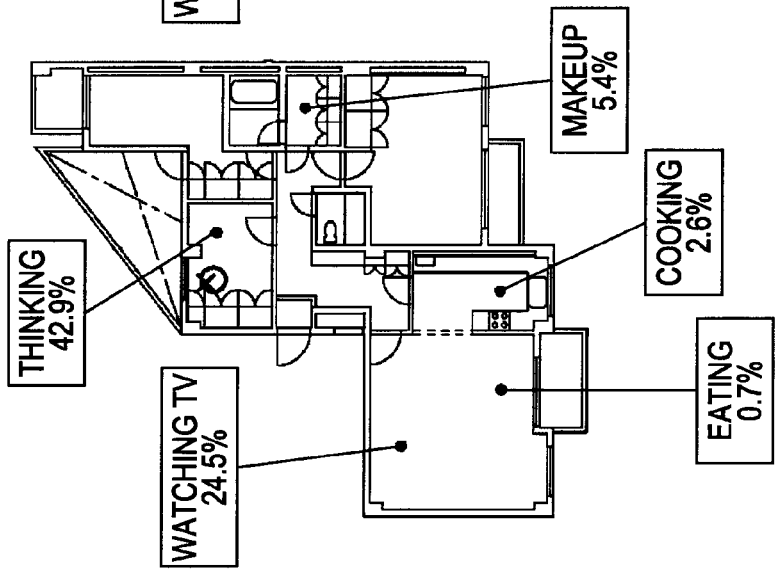

FIG. 17

| HMM State ID | Response Processing ID | | | | | | | | | |
|---|---|---|---|---|---|---|---|---|---|---|
| | 1 | 2 | 3 | 4 | 5 | 6 | 7 | 8 | 9 | 10 |
| 1 | 0 | 10 | 2 | 0 | 0 | 0 | 0 | 0 | 0 | 10 |
| 2 | 0 | 3 | 10 | 0 | 0 | 0 | 0 | 0 | 0 | 0 |
| 3 | 5 | 0 | 0 | 0 | 0 | 0 | 0 | 0 | 0 | 0 |
| 4 | 10 | 0 | 0 | 0 | 0 | 0 | 0 | 0 | 0 | 0 |
| 5 | 0 | 0 | 0 | 0 | 25 | 2 | 0 | 0 | 0 | 0 |
| 6 | 0 | 0 | 0 | 0 | 3 | 19 | 0 | 0 | 0 | 0 |
| 7 | 0 | 0 | 0 | 0 | 0 | 0 | 30 | 0 | 0 | 0 |
| 8 | 0 | 0 | 0 | 0 | 0 | 0 | 0 | 9 | 0 | 5 |
| 9 | 0 | 0 | 0 | 0 | 0 | 0 | 0 | 4 | 10 | 0 |
| 10 | 0 | 0 | 0 | 0 | 0 | 0 | 8 | 0 | 0 | 40 |

FIG. 18

| HMM STATE ID | Response Processing ID | | | | | | | | | |
|---|---|---|---|---|---|---|---|---|---|---|
| | 1 | 2 | 3 | 4 | 5 | 6 | 7 | 8 | 9 | 10 |
| 1 | 0 | 10 | 2 | 0 | 0 | 0 | 0 | 0 | 0 | 10 |
| 2 | 0 | 3 | 10 | 0 | 0 | 0 | 0 | 0 | 0 | 0 |
| 3 | 5 | 0 | 0 | 0 | 0 | 0 | 0 | 0 | 0 | 0 |
| 4 | 10 | 0 | 0 | 0 | 0 | 0 | 0 | 0 | 0 | 0 |
| 5 | 0 | 0 | 0 | 0 | 25 | 2 | 0 | 0 | 0 | 0 |
| 6 | 0 | 0 | 0 | 0 | 3 | 19 | 0 | 0 | 0 | 0 |
| 7 | 0 | 0 | 0 | 0 | 0 | 0 | 30 | 0 | 0 | 0 |
| 8 | 0 | 0 | 0 | 0 | 0 | 0 | 0 | 9 | 0 | 5 |
| 9 | 0 | 0 | 0 | 0 | 0 | 0 | 0 | 4 | 3 | 0 |
| 10 | 0 | 0 | 0 | 0 | 0 | 0 | 8 | 0 | 10 | 40 |

APPARATUS, METHOD, AND PROGRAM FOR PREDICTING USER ACTIVITY STATE THROUGH DATA PROCESSING

BACKGROUND OF THE INVENTION

1. Field of the Invention

The present invention relates to a data processing apparatus, a data processing method, and a program, in particular, a data processing apparatus, a data processing method, and a program for stochastically predicting a plurality of probabilities on activation states of a user at a desired time in future.

2. Description of the Related Art

In recent years, a research is actively conducted for modeling and learning a state of a user by using time-series data obtained from a wearable sensor which is a sensor the user can wear and recognizing the current state of the user by the model obtained through the learning. For example, "Life Patterns: structure from wearable sensors", Brian Patrick Clarkson, Doctor Thesis, MIT, 2002 proposes a method of recognizing a current activity location of the user from image pickup data accumulated simply in a time-series manner without previously defining the user activities as some activity models (labels). Also, a method of predicting a user activity at a following time on the basis of sensor data obtained from a sensor is proposed (for example, Japanese Unexamined Patent Application Publication No. 2006-134080, Japanese Unexamined Patent Application Publication No. 2008-204040, and "Life Patterns: structure from wearable sensors", Brian Patrick Clarkson, Doctor Thesis, MIT, 2002).

SUMMARY OF THE INVENTION

However, according to the technologies in the related art, the user activity at the subsequent time can be merely predicted, and a plurality of probabilities on activation states of the user at a time in future that elapses for a predetermined time from the current time are not stochastically predicted.

The present invention has been made in view of the above-mentioned circumstances, and it is desirable to stochastically predict a plurality of probabilities on the activation states of the user at a desired time in future.

According to an embodiment of the present invention, there is provided a data processing apparatus including: obtaining means configured to obtain time-series data from a wearable sensor; activity model learning means configured to learn an activity model representing a user activity state as a stochastic state transition model from the obtained time-series data; recognition means configured to recognize a current user activity state by using the activity model of the user obtained by the activity model learning means; and prediction means configured to predict a user activity state after a predetermined time elapses from a current time from the current user activity state recognized by the recognition means, wherein the prediction means predicts the user activity state after the predetermined time elapses as an occurrence probability, and calculates the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

According to an embodiment of the present invention, there is provided a data processing method for a data processing apparatus configured to process time-series data, the method including the steps of: obtaining the time-series data from a wearable sensor; learning an activity model representing a user activity state as a stochastic state transition model from the obtained time-series data; recognizing a current user activity state by using the activity model of the user obtained through the learning; and predicting a user activity state after a predetermined time elapses from a current time from the recognized current user activity state, predicting the user activity state after the predetermined time elapses as an occurrence probability, and calculating the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

According to an embodiment of the present invention, there is provided a program for causing a computer to function as: obtaining means configured to obtain time-series data from a wearable sensor; activity model learning means configured to learn an activity model representing a user activity state as a stochastic state transition model from the obtained time-series data; recognition means configured to recognize a current user activity state by using the activity model of the user obtained by the activity model learning means; and prediction means configured to predict a user activity state after a predetermined time elapses from a current time from the current user activity state recognized by the recognition means, wherein the prediction means predicts the user activity state after the predetermined time elapses as an occurrence probability, and calculates the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

According to the embodiment of the present invention, the time-series data is obtained from the wearable sensor, the activity model representing the user activity state is learnt as the stochastic state transition model from the obtained time-series data, the current user activity state is recognized by using the user activity model obtained through the learning, and the user activity state after the predetermined time elapses from the current time is predicted from the recognized current user activity state, the user activity state after the predetermined time elapses is predicted as an occurrence probability, and the occurrence probabilities of the respective states after the predetermined time elapses is calculated on the basis of the state transition probability of the stochastic state transition model to predict the user activity state after the predetermined time elapses, while it is presumed that observation probabilities of the respective states at the respective times of the stochastic state transition model are an equal probability.

According to the embodiment of the present invention, it is possible to stochastically predict a plurality of probabilities on the activation states of the user at a desired time in future.

BRIEF DESCRIPTION OF THE DRAWINGS

FIGS. 8A and 8B show the HMM on which a sparse restriction is imposed;

FIG. 9 is an explanatory drawing for describing an outline of a first experiment;

FIG. 10 is a block diagram showing a configuration example of the data processing apparatus used for a first experiment example;

FIGS. 16A to 16C show recognition results of a user activity prediction unit;

FIG. 17 is an explanatory drawing for describing a learning table of a response processing learning unit;

FIG. 18 is an explanatory drawing for describing a selection processing of a response processing selection unit;

DESCRIPTION OF THE PREFERRED EMBODIMENTS

Figure 1:
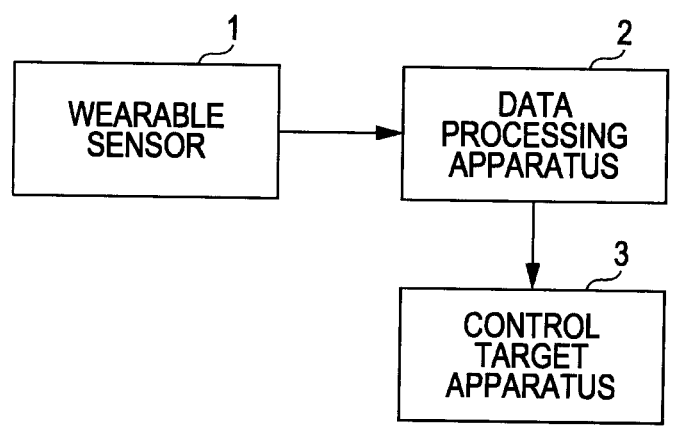
FIG. 1 is a block diagram showing a configuration example of a data processing system according to an embodiment to which the present invention is applied.

FIG. 1 is a block diagram showing a configuration example of a data processing system according to an embodiment to which the present invention is applied.

The data processing system of FIG. 1 is composed of a wearable sensor 1, a data processing apparatus 2, and a control target apparatus 3.

The wearable sensor 1 is a sensor the user itself can wear and is composed of, for example, a camera, a microphone, a GPS (Global Positioning System) receiver, a watch, an acceleration sensor, a gyro sensor, a biological information sensor, or the like. The wearable sensor 1 outputs time-series data obtained through the sensing (hereinafter, which will also be referred to as sensor data) to the data processing apparatus 2.

The data processing apparatus 2 is an apparatus with a portable size for the user and is configured to learn, on the basis of time-series data supplied from the wearable sensor 1, a user activity state (state representing an action and activity pattern) as a stochastic state transition model. For the stochastic state transition model used for the learning, for example, a stochastic state transition model such as an Ergodic HMM (Hidden Markov Model) including a hidden state can be adopted. The Ergodic HMM will be described with reference to FIG. 6 and the like.

By using the learnt stochastic state transition model, the data processing apparatus 2 first recognizes a current user activity state. Next, by using the learnt stochastic state transition model, the data processing apparatus 2 predicts occurrence probabilities of the respective states until a desired time in future from the sensor data obtained so far to stochastically predict the activation state of the user at a desired time in future. Then, the data processing apparatus 2 outputs a control signal to the control target apparatus 3 for causing the control target apparatus 3 to perform a predetermined processing in accordance with the predicted activity state of the user.

It should be noted that a part of the processing performed by the data processing apparatus 2 can be executed in such a manner that the data is transmitted to a remote apparatus through a wireless communication and a communication via the internet or the like and the processing is executed in the remote location.

The control target apparatus 3 is a target apparatus to be controlled by the data processing apparatus 2 such as, for example, a display, a speaker, an AV equipment, a lighting equipment, or a home electric appliance like an air-conditioning equipment. Alternatively, the control target apparatus 3 may also be a controller or the like for controlling the display, the speaker, the AV equipment, the lighting equipment, the air-conditioning equipment, or the like. Therefore, the number of the control target apparatuses 3 is not limited to one, and a plurality of control target apparatuses 3 may also exist.

It should be noted that the wearable sensor 1 and the data processing apparatus 2 are wearable, but the control target apparatus 3 is not limited to a wearable apparatus. Of course, the control target apparatus 3 may also be a wearable apparatus. Also, an exchange of signals between the data processing apparatus 2 and the control target apparatus 3 may be carried out in a wireless or wired manner.

According to the thus constructed data processing system, the following state can be realized.

For example, when an activity state in a case where the user is at home is learnt as a stochastic state transition model, the data processing apparatus 2 recognizes a current activity state, for example, in which the user is "in the living room", "in the kitchen", or the like. Then, the data processing apparatus 2 predicts a user activity state after a predetermined time elapses on the basis of the stochastic state transition model. For example, the data processing apparatus 2 predicts an activity state in which the user is "in the kitchen after the predetermined time elapses", "moved to the living room after the predetermined time elapses", or the like.

Then, the data processing apparatus 2 carries out a control corresponding to the predicted activity state on the control target apparatus 3. For example, in a case where the data processing apparatus 2 recognizes the current activity state in which the user is "in the kitchen" and the user is "moved to living room after the predetermined time elapses", the lighting equipment and the air-conditioning equipment functioning as the control target apparatuses 3 in the living room are turned ON. Also, the data processing apparatus 2 can turn ON a television receiver in the living room (hereinafter, which will be referred to as TV), a recording and reproduction apparatus, and the AV equipment such as an audio stereo.

Also, when an activity state in a case where the user is at an office is learnt as the stochastic state transition model, the data processing apparatus 2 can recognize the current activity state in which the user is "at office (at its own desk)", "at conference room", or the like. Then, in accordance with the predicted activity state after the predetermined time elapses, it is possible to carry out a control in which "air-conditioning equipments in the respective locations such as the conference room are turned ON", "copier is turned ON", "an elevator is moved to a floor where the user exists" or the like. That is, the control target apparatuses 3 in this case are the air-conditioning equipments, the copier, the elevator, or the like.

Furthermore, for example, in a scene in which the user is shopping in a shop, the current user activity state is recognized, that is, a product or the like the user is currently looking at is predicted, and the product information is displayed on a display functioning as the control target apparatus 3. Alternatively, information on a recommending product or the like among products on display in a traveling direction can be displayed on the display functioning as the control target apparatus 3.

Also, in a case where a movement route for the user to take for commuting, going to school, or the like is learnt as a model of the activity state, when the data processing apparatus 2 predicts, for example, that the user is heading to a station, a time table can be displayed on the display functioning as the control target apparatus 3. Also, the data processing apparatus 2 predicts a stopover shop from the movement route, and detail information on the shop (opening hours, sale information, and the like) can be displayed.

A detail of the data processing apparatus 2 with which the above-mentioned prediction of the user activity state and the corresponding control processing can be carried out will be described.

Detailed Configuration Example of the Data Processing Apparatus 2

Figure 2:
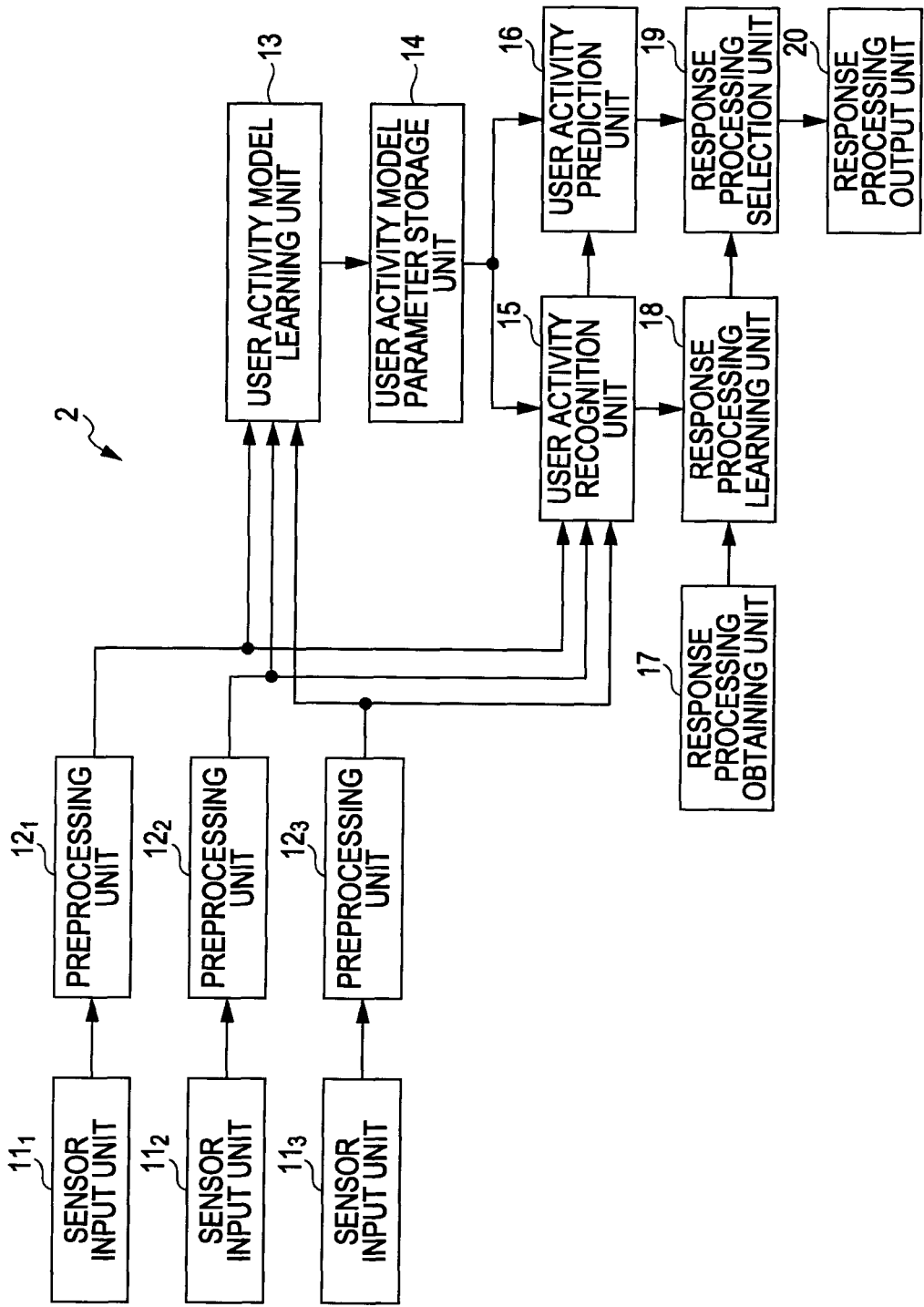
FIG. 2 is a block diagram showing a detailed configuration example of a data processing apparatus of FIG. 1.

FIG. 2 is a block diagram showing a detailed configuration example of the data processing apparatus 2.

A sensor input unit $11_1$ obtains sensor data output from the wearable sensor 1 to be supplied to a preprocessing unit $12_1$. The same applies to sensor input units $11_2$ and $11_3$. It should be however noted that pieces of sensor data obtained by the input units $11_1$ to $11_3$ are different from each other. Therefore, the data processing apparatus 2 can obtain the sensor data from the plural wearable sensors 1, and it is possible to provide the sensor input units 11 and the preprocessing units 12 in accordance with the number of the obtaining target wearable sensors 1. It should be noted that the number of the obtaining target wearable sensors 1 may of course be one. Hereinafter, the sensor input units $11_1$ to $11_3$ and the preprocessing units $12_1$ to $12_3$ are respectively simply referred to as the sensor input unit 11 and the preprocessing unit 12 if differentiation thereof provides no difference.

Each of the preprocessing units $12_1$ to $12_3$ applies a preprocessing on the sensor data supplied from the sensor input units $11_1$ to $11_3$ in accordance with data characteristics such as an image characteristic amount extraction processing or a low-pass filter processing to be supplied to a user activity model learning unit 13 and a user activity recognition unit 15. That is, each of the preprocessing units $12_1$ to $12_3$ converts the sensor data into data optimal to be supplied to the user activity model learning unit 13 and the user activity recognition unit 15 and supplies the converted sensor data to the user activity model learning unit 13 and the user activity recognition unit 15.

On the basis of the sensor data respectively supplied from the preprocessing units $12_1$ to $12_3$, the user activity model learning unit 13 learns stochastic state transition models (user activity models) obtained by modeling the activity states of the user. According to the present embodiment, for the stochastic state transition model, a model obtained by imposing the sparse restriction on the Ergodic HMM is adopted. The user activity model learning unit 13 supplies a parameter of the user activity models obtained as a result of the learning to a user activity model parameter storage unit 14. The user activity model parameter storage unit 14 stores the parameter supplied from the user activity model learning unit 13 and supplies the parameter to the user activity recognition unit 15 and a user activity prediction unit 16 as occasion arises.

It should be noted that the Ergodic HMM on which the sparse restriction is imposed, a calculation method for the parameter of the Ergodic HMM, and the like will be described with reference to FIG. 6 to FIGS. 8A and 8B.

When new sensor data is input via the sensor input unit 11 and the preprocessing unit 12, on the basis of the user activity modes obtained through the learning, the user activity recognition unit 15 recognizes (identifies) the current user activity state (hereinafter, which will also be referred to as user activity state). The user activity recognition unit 15 supplies the state ID representing the recognized current user activity state to the user activity prediction unit 16 and a response processing learning unit 18.

The user activity prediction unit 16 predicts the user activity state after the predetermined time elapses on the basis of the user activity modes obtained through the learning. To be more specific, the user activity prediction unit 16 is supplied with a state ID representing the current state of the user. From the user activity state at a current time T (T>0), the user activity prediction unit 16 decides an activity state whose occurrence probability is largest or an activity state whose occurrence probability is equal to or larger than a predetermined threshold at a time T+N after a predetermined time elapses (N>0). Then, the user activity prediction unit 16 supplies a state ID representing the decided activity state as a prediction result of the user activity state at the time T+N to a response processing selection unit 19.

A response processing obtaining unit 17 assigns a processing ID to each of controls on the control target apparatus 3 performed by the data processing apparatus 2. In a case where the control to which the processing ID is assigned is performed in the control target apparatus 3, the response processing obtaining unit 17 obtains the processing ID to be supplied to the response processing learning unit 18.

The response processing learning unit 18 stores a learning table in which the processing ID is associated with the state ID. In a case where the processing ID is supplied from the response processing obtaining unit 17, the response processing learning unit 18 counts up a count of the supplied processing ID in the state ID representing the current user activity state in the learning table. As a result, for each of the state IDs of the user activity states, the frequency of the processing ID is counted. According to this, the response processing learning unit 18 learns which operation (control) on the control target apparatus 3 when the user is in which activity state. That is, the response processing learning unit 18 learns the processing of the control target apparatus 3 corresponding to the state ID representing the current user activity state.

The response processing selection unit 19 is supplied with the state ID as the prediction result of the user activity state at the time T+N after the predetermined time elapses from the user activity prediction unit 16. The response processing selection unit 19 selects (decides) the processing ID of the processing corresponding to the state ID supplied from the user activity prediction unit 16 from the learning result stored in the response processing learning unit 18. The response processing selection unit 19 supplies the selected processing ID to a response processing output unit 20.

The response processing output unit 20 performs the control corresponding to the processing ID supplied from the response processing selection unit 19 TO the control target apparatus 3.

User Activity Model Learning Processing

Figure 3:
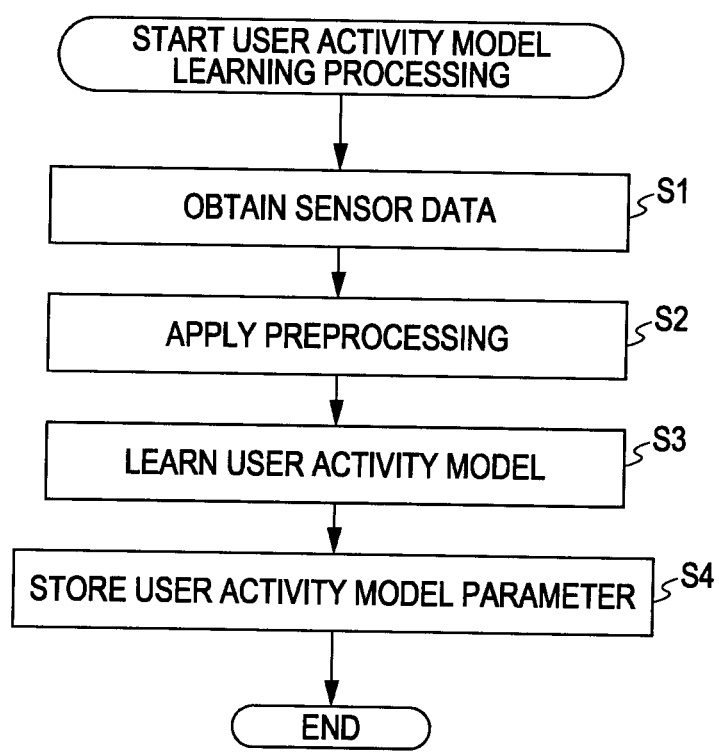
FIG. 3 is a flow chart for describing a user activity model learning processing.

FIG. 3 is a flow chart for describing a user activity model learning processing by the data processing apparatus 2.

First, in step S1, the sensor input unit 11 obtains the sensor data output by the wearable sensor 1 to be supplied to the preprocessing unit 12.

In step S2, the preprocessing unit 12 applies the preprocessing on the sensor data supplied from the sensor input unit 11 and supplies the sensor data after the processing to the user activity model learning unit 13.

In step S3, the user activity model learning unit 13 learns the user activity model on the basis of the sensor data supplied from the preprocessing unit 12. That is, the user activity model learning unit 13 calculates a parameter of the stochastic state transition model as the user activity model.

In step S4, the user activity model parameter storage unit 14 stores the parameter of the user activity model (user activity model parameter) obtained as a result of the learning by the user activity model learning unit 13 to end the processing.

Response Processing Learning Processing

Figure 4:
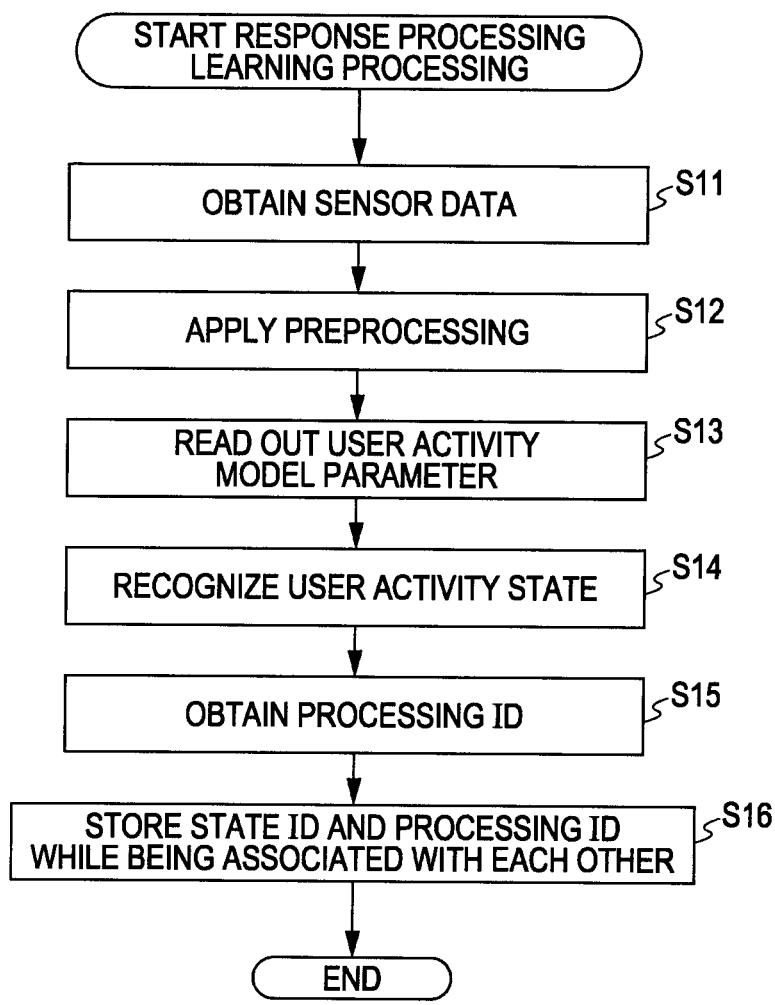
FIG. 4 is a flow chart for describing a response processing learning processing.

FIG. 4 is a flow chart for a response processing learning processing for learning a processing by the control target apparatus 3 for responding to the user activity state. This processing can be executed after the user activity model is decided by the user activity model learning processing of FIG. 3.

First, in step S11, the sensor input unit 11 obtains the sensor data output by the wearable sensor 1 to be supplied to the preprocessing unit 12.

In step S12, the preprocessing unit 12 applies the preprocessing on the sensor data supplied from the sensor input unit 11 and supplies the sensor data after the processing to the user activity recognition unit 15.

In step S13, the user activity recognition unit 15 reads out the parameter of the user activity model from the user activity model parameter storage unit 14.

In step S14, the user activity recognition unit 15 recognizes (identifies) the current user activity state on the basis of the user activity model based on the read out parameter. The user activity recognition unit 15 supplies the state ID representing the user activity state as the recognition result to the response processing learning unit 18.

In step S15, the response processing obtaining unit 17 obtains the processing ID of the processing performed in the control target apparatus 3 to be supplied to the response processing learning unit 18. The processing in step S14 and the processing in step S15 are performed in parallel.

In step S16, the response processing learning unit 18 stores the processing ID supplied from the response processing obtaining unit 17 and the state ID representing the current user activity state supplied from the user activity recognition unit 15 while being associated with each other in the learning table to end the processing.

By repeatedly executing the above-mentioned processing, the data processing apparatus 2 can learn which operation (control) on the control target apparatus 3 when the user is in which state.

User Activity Prediction Control Processing

Figure 5:
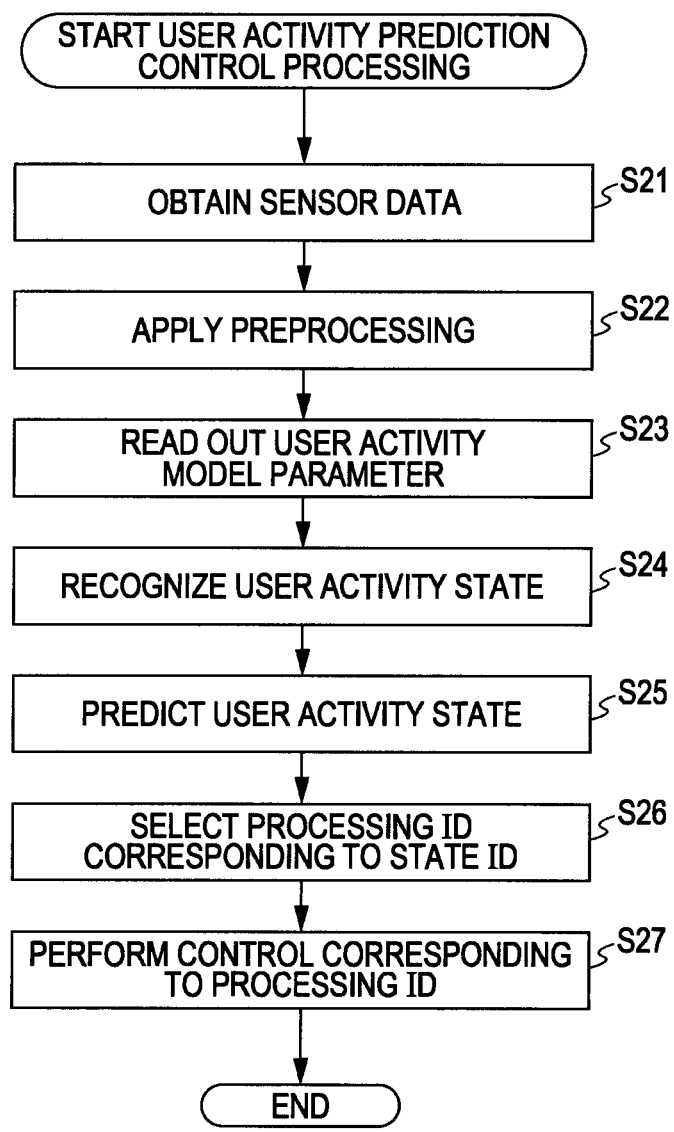
FIG. 5 is a flow chart for describing a user activity prediction control processing.

FIG. 5 is a flow chart for a user activity prediction control processing for predicting an activity state of the user on the basis of the input sensor data and performing a control on the control target apparatus 3 in accordance with the predicted user activity state. This processing can be executed after the execution of the user activity model learning processing of FIG. 3 and the response processing learning processing of FIG. 4 or in parallel with the response processing learning processing of FIG. 4.

First, in step S21, the sensor input unit 11 obtains the sensor data output by the wearable sensor 1 to be supplied to the preprocessing unit 12.

In step S22, the preprocessing unit 12 applies the preprocessing on the sensor data supplied from the sensor input unit 11 and supplies the sensor data after the processing to the user activity recognition unit 15. The processings in steps S14 and S15 are identical to the processings in steps S11 and S12 of FIG. 4. In a case where the processing of FIG. 5 is executed in parallel with the processing of FIG. 4, steps S11 and S21 and steps S12 and S22 can be respectively executed as a single processing.

In step S23, the user activity prediction unit 16 reads out the parameter of the user activity model from the user activity model parameter storage unit 14. Also in step S23, the user activity recognition unit 15 also reads out the parameter of the user activity model from the user activity model parameter storage unit 14.

In step S24, the user activity recognition unit 15 recognizes the current user activity state from the user activity model based on the read out parameter. Then, the user activity recognition unit 15 supplies the state ID representing the user activity state as the recognition result to the response processing learning unit 18.

In step S25, while the user activity state at the current time T is set as the starting point, the user activity prediction unit 16 predicts the user activity state at the time T+N after the predetermined time elapses. The user activity prediction unit 16 supplies the state ID representing the user activity state after the predetermined time elapses which is the prediction result to the response processing selection unit 19.

In step S26, the response processing selection unit 19 selects the processing ID corresponding to the state ID supplied from the user activity prediction unit 16 from the learning table stored in the response processing learning unit 18 through the processing of FIG. 4. That is, the response processing selection unit 19 selects the control on the control target apparatus 3 corresponding to the user activity state predicted at the time T+N. The selected processing ID is supplied to the response processing output unit 20.

In step S27, the response processing output unit 20 performs the control corresponding to the processing ID supplied from the response processing selection unit 19 on the control target apparatus 3 to end the processing.

As described above, in the data processing apparatus 2, the parameter of the user activity model is calculated by the user activity model learning processing of FIG. 3, and on the basis of the user activity model using the calculated parameter, the current user activity state is recognized. Then, from the current user activity state, the user activity state at the predetermined time T+N in future is predicted, and the control in accordance with the predicted user activity state is performed on the control target apparatus 3.

With Regard to Ergodic HMM

Next, the Ergodic HMM adopted by the data processing apparatus 2 as the learning model will be described.

Figure 6:
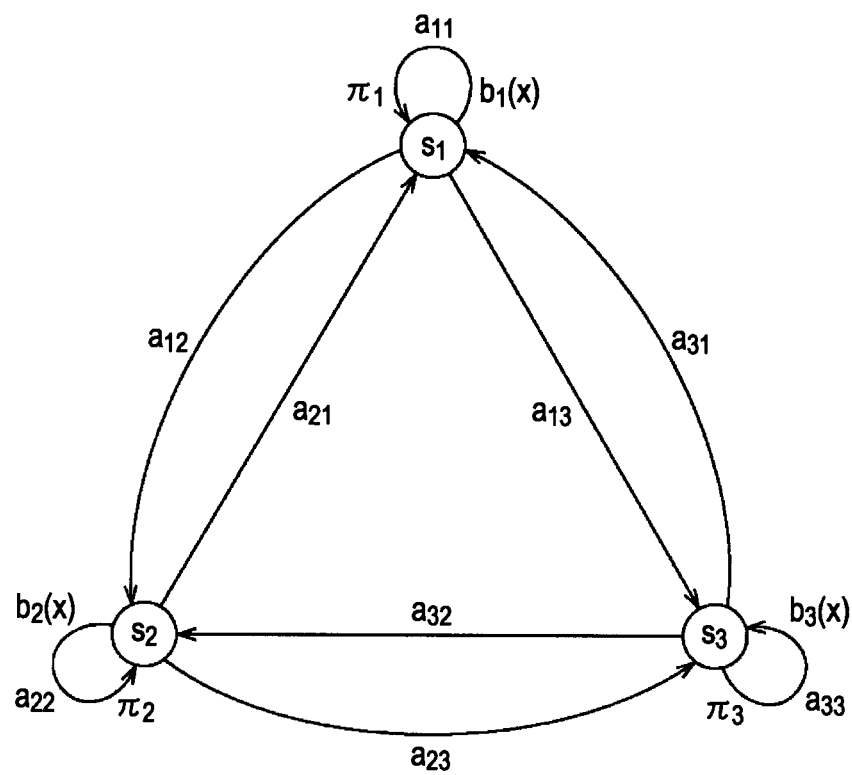
FIG. 6 shows an example of an HMM.

FIG. 6 shows examples of the HMM.

The HMM is a state transition model having a state and a transition between states.

FIG. 6 shows examples of the HMM in three states.

In FIG. 6 (the same applies to the subsequent drawings), a circle mark represents a state (corresponding to the above-mentioned user activity state), and an arrow mark represents a state transition.

Also, in FIG. 6, $s_i$ (in FIG. 6, i=1, 2, 3) represents a state, and $a_{ij}$ represents a state transition probability for a state transition from a state $s_i$ to a state $s_j$. Furthermore, $b_j(x)$ represents an output probability density function in which an observed value x is observed is at the time of the state transition to the state $s_j$, and $\pi_i$ represents an initial probability at which the state $s_i$ is in an initial state.

It should be noted that for the output probability density function $b_j(x)$, for example, a contaminated normal probability distribution or the like is used.

Herein, the HMM (continuous HMM) is defined by the state transition probability $a_{ij}$, the output probability density function $b_j(x)$, and the initial probability $\pi_i$. The state transition probability $a_{ij}$, the output probability density function $b_j(x)$ and the initial probability $\pi_i$ are referred to as parameter $\lambda$ of the HMM={$a_{ij}$, $b_j(x)$, $\pi_i$, i=1, 2, ..., M, j=1, 2, ..., M}. M represents the number of states of the HMM.

For the method of estimating the parameter $\lambda$ of the HMM, the maximum likelihood estimation method of Baum-Welch is widely utilized. The maximum likelihood estimation method of Baum-Welch is an estimation method of the parameter based on EM (Expectation-Maximization) algorithm.

According to the maximum likelihood estimation method of Baum-Welch, on the basis of the observed time-series data $x=x_1, x_2, \ldots, x_T$, the estimation of the parameter $\lambda$ of the HMM is carried out so that the likelihood obtained from the occurrence probability which is the probability where the time-series data is observed (generated) is largest. Herein, $x_t$ represents a signal observed at the time t (sample value), and T represents a length of the time-series data (sample number).

The maximum likelihood estimation method of Baum-Welch is described, for example, in "Pattern Recognition and Machine Learning (Information Science and Statistics)", Christopher M. Bishop, Springer, N.Y., 2006) (which will be referred to as document A).

The sensor data obtained by the sensor input unit 11 is supplied as the time-series data $x=x_1, x_2, \ldots, x_T$ to the preprocessing unit 12. Then, the sensor data on which a predetermined processing is applied by the preprocessing unit 12 is supplied as the time-series data $x'=x_1', x_2', \ldots, x_T'$ to the user activity model learning unit 13.

Therefore, the user activity model learning unit 13 estimates the parameter $\lambda$, of the HMM representing the user activity model by using the sensor data after the preprocessing $x'=x_1', x_2', \ldots, x_T'$.

It should be noted that the maximum likelihood estimation method of Baum-Welch is a parameter estimation method based on the likelihood maximization but does not guarantee the optimality, and this may be converged to a local solution depending on a structure of the HMM and an initial value of the parameter $\lambda$.

The HMM is widely utilized in phonetic recognition. In the HMM utilized in the phonetic recognition, in general, the number of states, a manner of the state transition, and the like are previously decided.

Figure 7:
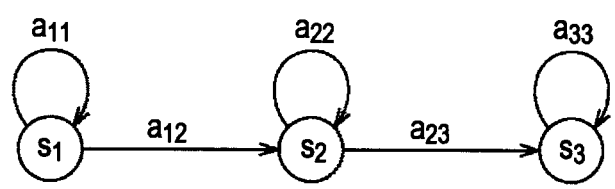
FIG. 7 shows an example of a left-to-right type HMM.

FIG. 7 shows an example of the HMM utilized in the phonetic recognition.

The HMM of FIG. 7 is referred to as left-to-right type.

In FIG. 7, the number of states is 3, and the state transition is restricted to a structure only allowing a self-transition (the state transition from the state $s_i$ to the state $s_i$) and the state transition from the state in the left to the adjacent state in the right.

In contrast to the HMM where a restriction on the state transition exists like the HMM of FIG. 7, the HMM shown in FIG. 6 where a restriction on the state transition does not exist, that is, the HMM allowing a state transition from an arbitrary state $s_i$ to an arbitrary state $s_j$ is referred to as Ergodic HMM.

The Ergodic HMM is an HMM having an extremely high freedom in structure, but if the number of states is large, the estimation of the parameter $\lambda$ is difficult.

For example, in a case where the number of states in the Ergodic HMM is 1000, the number of the state transitions is 1 million (=1000×1000).

Therefore, in this case, among the parameter $\lambda$, for example, with regard to the state transition probability $a_{ij}$, 1 million of the state transition probabilities $a_{ij}$ are estimated.

In view of the above, it is possible to impose a restriction (sparse restriction) of a sparse structure, for example, on the state transition which is set with respect to the state.

Herein, the sparse structure is a structure in which a state allowing the state transition from a certain state is extremely limited unlike the dense state transition such as the Ergodic HMM allowing the state transition from an arbitrary state to an arbitrary state. It should be noted that herein, even in the case of the sparse structure, at least one state transition to another state exists, and also the self-transition exists.

FIGS. 8A and 8B show the HMM on which the sparse restriction is imposed.

Herein, in FIGS. 8A and 8B, a bidirectional arrow connecting two states represents a state transition from one state to another state of the two states and a state transition from the other state to the one state. Also, in FIGS. 8A and 8B, the respective states allow the self-transition, and an illustration of an arrow representing the self-transition is omitted.

In FIGS. 8A and 8B, 16 states are arranged on a two-dimensional space in a reticular pattern. That is, in FIGS. 8A and 8B, in the lateral direction, four states are arranged, and also in the vertical direction, four states are arranged.

Now, a distance between states adjacent in the lateral direction and distance between states adjacent in the vertical direction are both set as 1, and then FIG. 8A shows an HMM on which a sparse restriction is imposed in which the state transition to the state at a distance equal to or smaller than 1 is allowed, and the state transition to the other state is not allowed.

Also, FIG. 8B shows an HMM on which a sparse restriction is imposed in which to the state at a distance equal to or smaller than $\sqrt{2}$ is allowed, and the state transition to the other state is not allowed.

The user activity recognition unit 15 applies Viterbi method to the user activity modes obtained through the learning (HMM) to obtain a process of the state transition (line of the states) (path) (hereinafter, which will also be referred to as maximum likelihood path) in which the likelihood at which the sensor data after the processing $x'=x_1', x_2', \ldots, x_T'$ from the preprocessing unit 12 is observed is largest. According to this, the current user activity state is recognized.

Herein, the Viterbi method is an algorithm for deciding a path (maximum likelihood path) for maximizing an value (occurrence probability) which is obtained by accumulating the state transition probability $a_{ij}$ at which the state transition from the state $s_i$ to the state $s_j$ is carried out at the time t among the paths of the state transitions starting from the respective states $s_i$ and a probability (output probability obtained from the output probability density function $b_j(x)$) at which the sample value $x'_t$ at the time T is observed among the sensor data after the processing $x'=x_1', x_2', \ldots, x_T'$ in the state transition over the length T of the time-series data after the processing x'.

The user activity prediction unit 16 applies Forward-Backward algorithm to the user activity modes obtained through the learning (HMM), and it is possible to calculate the occurrence probabilities of the respective states $s_i$ until the time T+N while the current user activity state recognized by the user activity recognition unit 15 is set as the starting point. It should be noted that when the occurrence probabilities are calculated, the user activity prediction unit 16 can adopt a method of calculating the occurrence probabilities of the respective states $s_i$ until the time T+N on the basis of the state transition probability $a_{ij}$ while it is presumed that the observation probabilities of the respective states $s_i$ at the respective times are an equal probability or a method of calculating the occurrence probabilities of the respective states $s_i$ until the time T+N by deciding in an experimental manner with use of random numbers on the basis of the state transition probability $a_{ij}$.

Herein, the Forward-Backward algorithm is an algorithm for calculating a probability value by integrating a forward probability $\alpha_i(t)$ obtained by propagating the probability to reach the respective states $s_i$ forward in the time direction and a backward probability $\beta_i(t)$ obtained by propagating the probability to reach the respective states $s_i$ backward in the time direction. It should be noted that it is also possible to use only the Forward algorithm for calculating the forward probability $\alpha_i(t)$ or the Backward algorithm for calculating the backward probability $\beta_i(t)$.

The Viterbi method is described on P. 347 of the above-mentioned document A, and the Forward-Backward algorithm is described on P. 336 of the above-mentioned document A.

First Experiment Example

Next, specific example of the learning of the user activity model and the prediction control by the data processing apparatus 2 will be described. First, an outline of a first experience will be described with reference to FIG. 9.

According to the first experiment, the user carries around a camera functioning as the wearable sensor 1, and data of images (video) visually recognized by the user is obtained as the time-series data. In a residence shown in FIG. 9, user performs activities (actions) including (1) watching TV in a living room, (2) eating in a dining space, (3) thinking in a study, (4) cooking in a kitchen, and (5) makeup in a wash room. Also, the user performs operations such as turning ON room light and turning ON a TV switch on the lighting equipment, the television receiver, and the like functioning as the control target apparatuses 3.

On the basis of the time-series data of the images obtained along with the activities of the user, the data processing apparatus 2 causes the Ergodic HMM to learn the user activity state. Then, as a verification after the learning, time-series data of new images obtained through an action of the user is input, and the recognition of the user activity state by the user activity recognition unit 15 is compared with the actual user activity. It should be noted that only the time-series data of the images is obtained from the camera functioning as the wearable sensor 1 by the data processing apparatus 2, and labeling or the like related to the user activity is not carried out. It should be however noted that, as the verification after the learning, in order to compare the actual activity of the user with the recognition result, in the present experience, pseudo-coordinates indicating positions in the residence are added to the obtained respective images. Also, average values of the pseudo-coordinates of the input images allocated in the state are associated with the respective states after the learning too, and the respective states the recognition results can be checked with the pseudo-coordinates.

Configuration of the Data Processing Apparatus 2 in the First Experiment Example FIG. 10 is a block diagram showing a configuration example of the data processing apparatus 2 used for the first experiment example.

A sensor input unit 11-1 obtains time-series image data output from the camera functioning as the wearable sensor 1 as sensor data to be supplied to a preprocessing unit 12-1.

The preprocessing unit 12-1 extracts an image characteristic amount from the image data supplied from the sensor input unit 11-1. That is, the preprocessing unit 12-1 converts the time-series image data into the time-series data of the image characteristic amount. Furthermore, the preprocessing unit 12-1 compresses the number of dimensions of the time-series data of the image characteristic amount and supplies the time-series data of the image characteristic amount after the dimension compression to a user activity model learning unit 13-1 and a user activity recognition unit 15-1.

The preprocessing unit 12-1 adopts a characteristic amount called GIST, for example, as the extracted image characteristic amount. A detail of the GIST is described in "Context-based vision system for place and object recognition", A. Torralba, K. P. Murphy, W. T. Freeman and M. A. Rubin, IEEE Intl. Conference on Computer Vision (ICCV), Nice, France, October 2003.

It should be noted that the image characteristic amount is not limited to the GIST, and for example, it is also possible to adopt HLCA (higher order local correlation), LBP (Local Binary Patterns), a color histogram, an edge histogram, and the like.

A detail of the HLCA is described, for example, in N. Otsu, T. Kurita, "A new scheme for practical flexible and intelligent vision systems", Proc. IAPR Workshop on Computer Vision, pp. 431-435, 1988. A detail of LBP is described, for example, in Ojala T, Pietikäinen M & Maenpää T, "Multiresolution gray-scale and rotation invariant texture classification with Local Binary Patterns", IEEE Transactions on Pattern Analysis and Machine Intelligence 24(7): 971-987.

Also, the preprocessing unit 12-1 can carry out the dimension compression of the time-series data of the image characteristic amount by performing a principal component analysis (PCA). The preprocessing unit 12-1 compresses (limits) the number of dimensions of the time-series data of the image characteristic amount (GIST) on the basis of the result of the PCA so that an accumulated contributing rate becomes a relatively high value (for example, no less than 95 or the like).

The user activity model learning unit 13-1 calculates the parameter $\lambda$ of the Ergodic HMM on which the sparse restriction is imposed while the time-series data of the image characteristic amount after the dimension compression supplied from the preprocessing unit 12-1 is set as the above-mentioned sensor data $x'=x_1', x_2', \ldots, x_T'$. It should be noted that the initial probabilities $\pi_i$ of the states $s_i$ can be set as a uniform value. For example, the initial probability $\pi_i$ of each of M states $s_i$ is set as 1/M.

A user activity model parameter storage unit 14-1 stores the parameter $\lambda$ calculated by the user activity model learning unit 13-1 to be supplied to the user activity recognition unit 15 and the user activity prediction unit 16 as occasion arises.

The user activity recognition unit 15-1 applies the Viterbi method to the user activity modes obtained through the learning (HMM) and recognizes (identifies) the current user activity state. The user activity recognition unit 15-1 supplies the state ID representing the recognized current user activity state to the user activity prediction unit 16 and the response processing learning unit 18.

On the basis of the state ID representing the current user activity state, a user activity prediction unit 16-1 predicts the user activity state at the time T+N after a desired time elapses from the current time T and supplies the state ID of the predicted activity state to a response processing selection unit 19-1. Herein, the user activity prediction unit 16-1 calculates the occurrence probabilities of the respective states $s_i$ until a time T+N while it is presumed that the probability at which the sample values $x'_{T+1}$ to $x'_{t+N}$ of the respective states $s_i$ are observed at the time T+1 to T+N is 1. Then, at the time T+N after the predetermined time elapses, the user activity prediction unit 16-1 predicts a state in which the occurrence probability is largest or a state in which the occurrence probability is equal to or larger than a predetermined threshold as the user activity state at the time T+N.

A response processing obtaining unit 17-1 receives and obtains signals indicating ON or OFF of the lighting in the respective rooms, ON or OFF of the TV switch, and ON or OFF of the air conditioner and supplies the signals to a response processing learning unit 18-1 as the processing IDs corresponding to the respective controls.

When the processing ID is supplied from the response processing obtaining unit 17-1, the response processing learning unit 18-1 counts up a frequency of the supplied processing ID in the state ID representing the current user activity state of the learning table. According to this, the response processing learning unit 18-1 counts up a co-occurrence frequency of the processing IDs corresponding to the respective states IDs.

When a predetermined state ID is supplied from the user activity prediction unit 16-1, the response processing selection unit 19-1 selects (decides) the processing ID of the processing to be carried out with respect to the supplied state ID from the learning table of the response processing learning unit 18-1. To be more specific, the response processing selection unit 19-1 selects the processing ID with the highest frequency from the learning table with respect to the supplied state ID and supplies the processing ID to a response processing output unit 20-1. It should be noted that the response processing selection unit 19-1 may select a plurality of processing IDs having a frequency equal to or larger than a predetermined threshold with respect to the supplied state ID.

In accordance with the processing ID supplied from the response processing selection unit 19-1, the response processing output unit 20-1 controls the control target apparatus 3. For example, in a case where the user is predicted to be in the living room at the time T+N, the response processing output unit 20-1 sends control signals for turning ON the lighting and the air conditioner in the living room to the lighting equipment and the air conditioner functioning as the control target apparatus 3.

The above-mentioned experiment results of the first experience using the data processing apparatus 2 will be described with reference to FIG. 11 to FIG. 18.

Processing Result of the Preprocessing Unit 12-1

Figure 11:
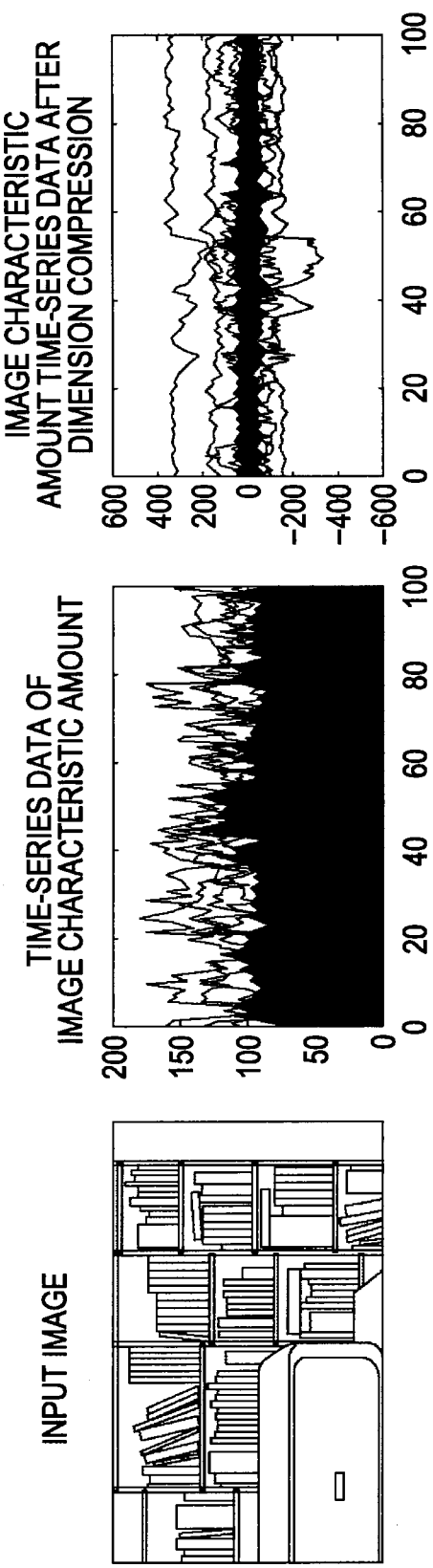
FIG. 11 shows a processing result of a preprocessing unit.
Figure 12:
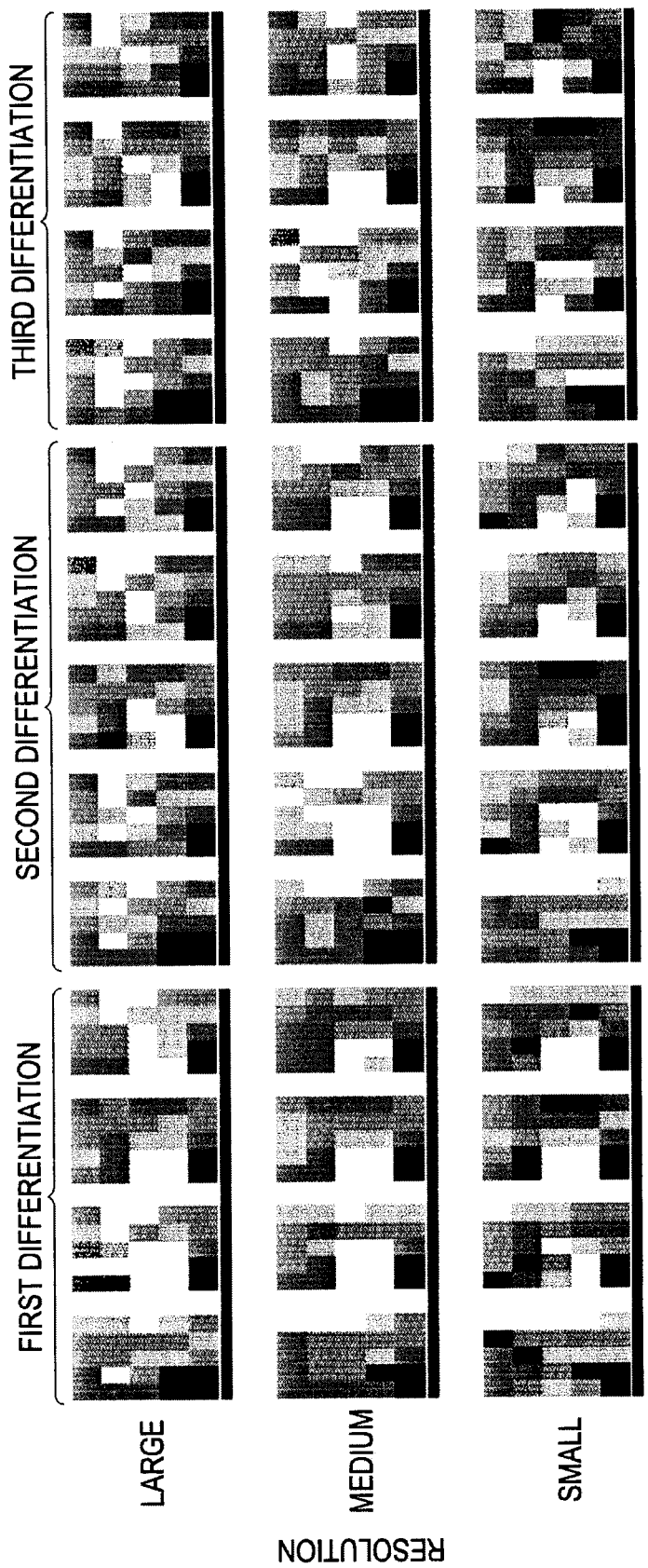
FIG. 12 shows a processing result of the preprocessing unit.

FIG. 11 and FIG. 12 show processing results by the preprocessing unit 12-1.

FIG. 11 shows an example of an input image supplied from the sensor input unit 11-1, the time-series data of the image characteristic amount extracted by the preprocessing unit 12-1, and the time-series data of the image characteristic amount after the dimension compression. It should be noted that the input image is obtained by illustrating the picked up image due to space limitation, and display of image contrasting density is also omitted.

In the time-series data of the image characteristic amount (at the center of FIG. 11) extracted from the input image, about the dimension number as high as 1000 dimensions exist, and in contrast, in the time-series data of the image characteristic amount after the dimension compression by the principal component analysis (on the right of FIG. 11), the dimension number is compressed to about 50 dimensions.

FIG. 12 shows an extraction processing for the image characteristic amount of the input image by the preprocessing unit 12-1.

FIG. 12 shows an example of GIST calculation with respect to the input image in gray scale (8-bit gradation sequence). That is, the preprocessing unit 12-1 sets a value obtained by dividing an output of a steerable filter into 5×5 to be averaged as the image characteristic amount with respect to the input image in gray scale. Herein, in the parameter of the steerable filter, the resolution has three stages including large, medium, and small, the differentiation filter has three stages including the first differentiation, the second differentiation, and the third differentiation, the direction parameter has four directions (up, down, right, and left. It should be noted that for the differentiation filter of the second differentiation, the direction parameter in the all axis direction can also be calculated in addition to the direction parameter in the respective axes, and therefore the filter outputs in the five directions are used.

Learning Result of the User Activity Model Learning Unit 13-1

Figure 13:
FIG. 13 shows a learning result of a user activity model learning unit.
Figure 14:
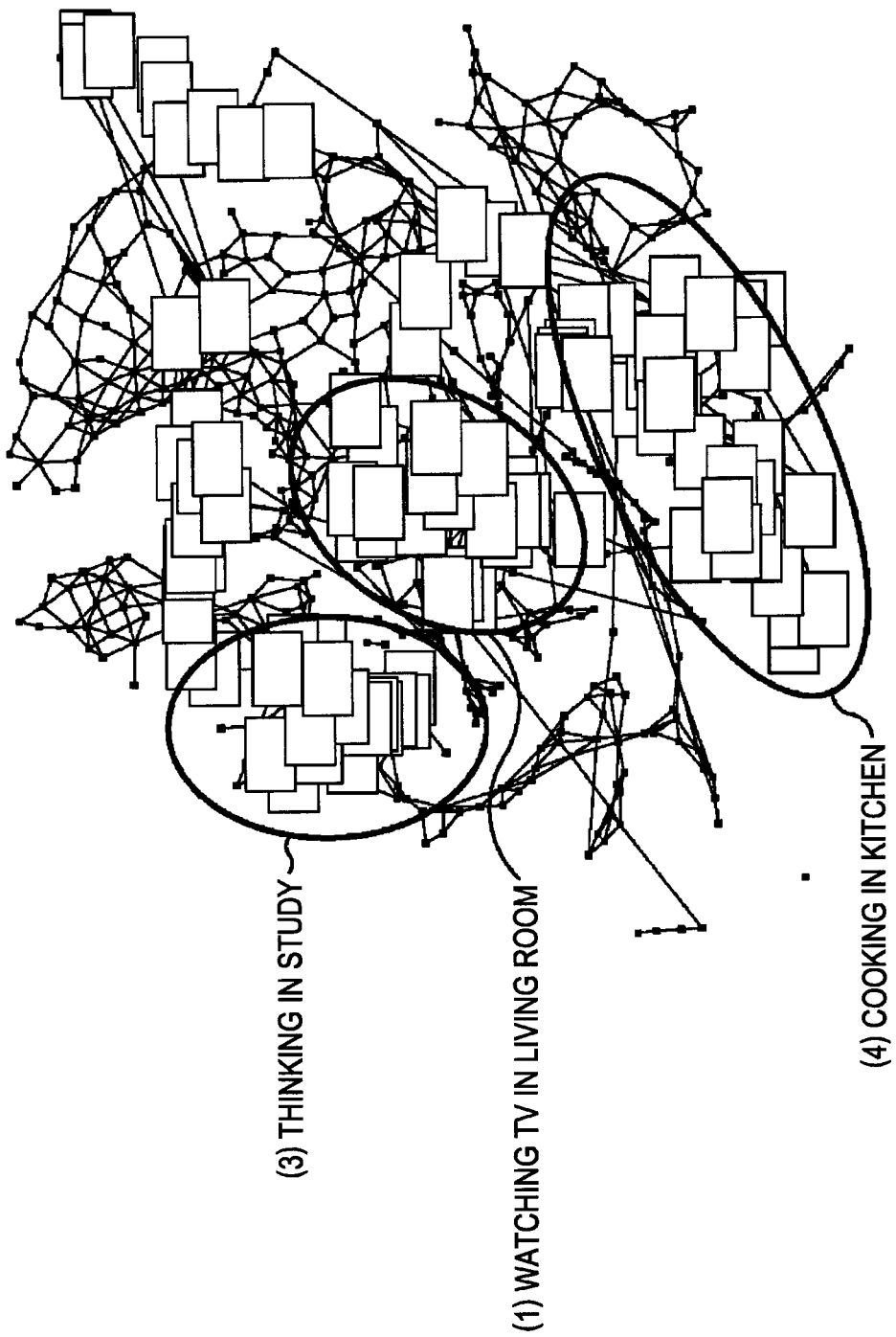
FIG. 14 shows a learning result of the user activity model learning unit.

FIG. 13 and FIG. 14 show the HMM obtained as a result of the learning by the user activity model learning unit 13-1.

In FIG. 13 and FIG. 14, a black circle represents coordinates (x, y) of the respective states $s_j$ for the HMM decided so that the states having the large transition probability are arranged as close as possible on the basis of the state transition probability $a_{ij}$ by using a method called Sammon map and is equivalent to the state $s_j$. Herein, the number of states M is set as 600.

Also, in FIG. 13 and FIG. 14, in a case where the state transition probability $a_{ij}$ of the state transition from the state $s_i$ to the state $s_j$ is larger than 0 (in the case of the state transition where the state transition from the state $s_i$ to the state $s_j$ is valid), the black circle equivalent to the state $s_i$ and the black circle equivalent to the state $s_j$ are connected by a straight light (line segment). Therefore, in FIG. 13 and FIG. 14, the straight line connecting the mutual black circles is equivalent to the (valid) state transition.

It should be noted that in FIG. 13 and FIG. 14, illustration of arrows indicating the direction of the state transition is omitted.

FIG. 14 shows a state in which a part of the input images belonging to such as (1) watching TV in the living room, (3) thinking in the study, and (4) cooking in the kitchen the respective states $s_i$ is overlapped on the HMM after the learning shown in FIG. 13. It should be noted that the input image is represented by a gray rectangular.

By observing the input images arranged on the state $s_j$, the same user activity states such as (1) watching TV in the living room, (3) thinking in the study, and (4) cooking in the kitchen are arranged in the adjacent HMM states. That is, the user activity states recognized from the input images are appropriately recognized and sorted out.

It is possible to mention that the learning and the recognition by the HMM is a type of clustering based on the image characteristic amount. However, the clustering simply using the image characteristic amount only focuses on the similarity of the images, and thus the correlation between the images having little similarity is low. On the other hand, in the learning and the recognition by the HMM, the clustering is carried out while including not only the image characteristic amount but also the temporal anteroposterior relation. In a case where an image having a predetermined characteristic amount appears after an image having a certain characteristic amount, the correlation between the images even having little similarity in their image characteristic amounts is high. Therefore, through the learning using the HMM, even if the labeling is not performed on the input images, the user activity states can be appropriately recognized and sorted out.

Recognition Result of the User Activity Recognition Unit 15-1

Figure 15C:
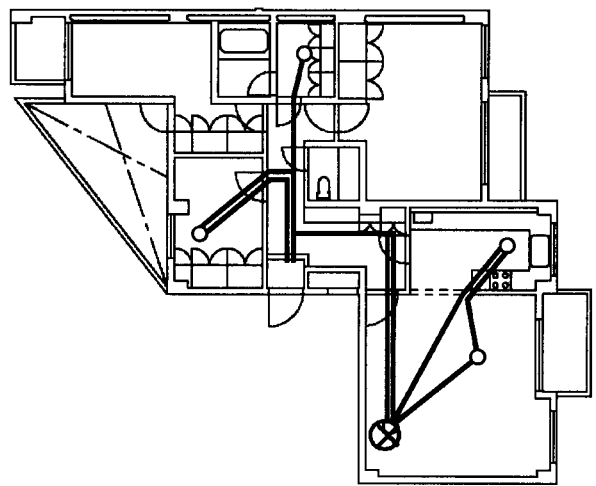
FIGS. 15A to 15C show recognition results of a user activity recognition unit.
Figure 15B:
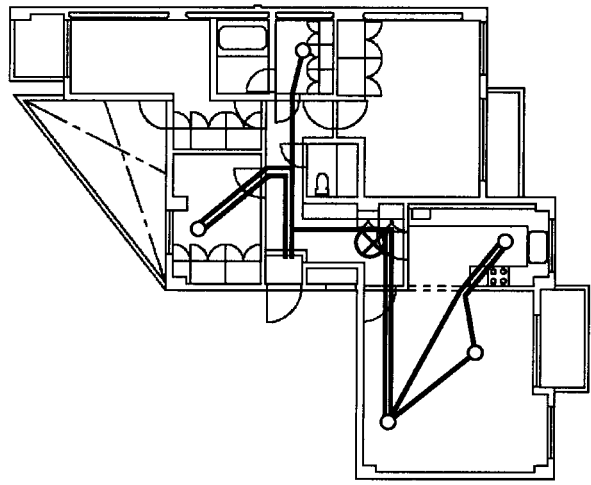
Figure 15A:
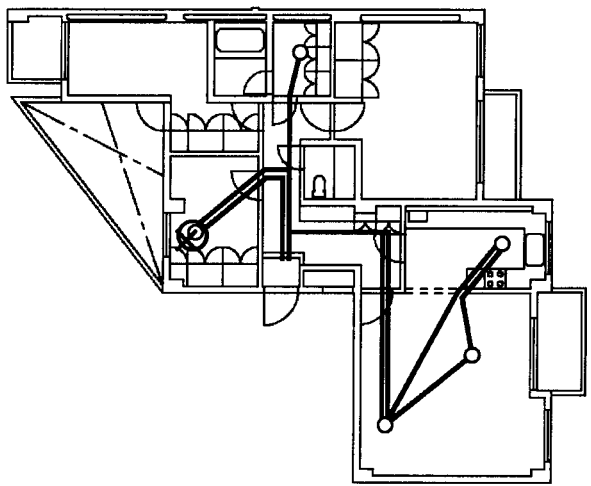

FIGS. 15A to 15C show results of recognition by the user activity recognition unit 15-1.

FIGS. 15A to 15C show states in which when a new input image which is not used for the learning is provided to the data processing apparatus 2, the state $s_i$ as the recognition result recognized by the user activity recognition unit 15-1 is represented by a black dot on the room layout diagram similar to that of FIG. 9.

It should be noted that of course, for the recognition processing, the pseudo-coordinates added to the image data are not used. Also, as described above, the pseudo-coordinates corresponding to the state $s_i$ the recognition result are calculated from the average value of the pseudo-coordinates of the input image allocated to the state.

In FIG. 15A, the cross mark (x) represents a true value of the input image at a certain time when the user is "(3) thinking in the study", that is, the pseudo-coordinates added to the input image. On the other hand, the circle mark (○) represents the recognition result of the user activity recognition unit 15-1 with respect to the input image of the cross mark (x), that is, the pseudo-coordinates corresponding to the state $s_i$ in which the input image of the cross mark is recognized.

In FIG. 15B, the cross mark (x) represents a true value of the input image at a certain time when the user is "moving to the living room", that is, the pseudo-coordinates added to the input image. On the other hand, the circle mark (○) represents the recognition result of the user activity recognition unit 15-1 with respect to the input image of the cross mark (x), that is, the pseudo-coordinates corresponding to the state $s_i$ in which the input image of the cross mark is recognized.

In FIG. 15B, the cross mark (x) represents a true value of the input image at a certain time when the user is "(1) watching TV in the living room", that is, the pseudo-coordinates added to the input image. On the other hand, the circle mark (○) represents the recognition result of the user activity recognition unit 15-1 with respect to the input image of the cross mark (x), that is, the pseudo-coordinates corresponding to the state $s_i$ in which the input image of the cross mark is recognized.

In either user activity state of FIGS. 15A to 15C, the cross mark and the circle mark are extremely close to each other, and from the learnt HMM, it is possible to mention that the user activity states can be appropriately recognized.

Prediction Result of the User Activity Prediction Unit 16-1

FIGS. 16A to 16C show prediction results by the user activity prediction unit 16-1.

FIGS. 16A to 16C each represent the prediction results of the user activity three minutes after the current user activity state recognized by the user activity prediction unit 16-1 as the occurrence probabilities of the respective activity states.

It should be noted that the occurrence probabilities of the respective activity states are obtained in the following manner. For example, with regard to the probability of "(1) watching TV in the living room", a case where the pseudo-coordinates corresponding to the state $s_i$ are within a predetermined range in the living room is defined as "(1) watching TV in the living room", and a probability is obtained at which the pseudo-coordinates corresponding to the state $s_i$ three minutes after the recognition result are within the defined predetermined range. The same applies to the occurrence probabilities of the other user activity states.

FIG. 16A shows the user activity state predicted in three minutes in a case where the current user activity state is "(3) thinking in the study".

In a case where the current user activity state is "(3) thinking in the study", the probability at which the user is still "(3) thinking in the study" in three minutes is 42.9%. The probability at which the user is "(1) watching TV in the living room" in three minutes is 24.5%. The probability at which the user is doing "(5) makeup in the wash room" in three minutes is 5.4%. Also, the probabilities at which the user is "(4) cooking in the kitchen" and at which the user is "(2) eating in the dining space" are respectively 2.6% and 0.7%.

FIG. 16B shows the user activity state predicted in three minutes in a case where the current user activity state is "(1) watching TV in the living room".

In a case where the current user activity state is "(1) watching TV in the living room", the probability at which the user is still "(1) watching TV in the living room" in three minutes is 63.6%. The probability at which the user is "(4) cooking in the kitchen" in three minutes is 12.3%. The probability at which the user is "(3) thinking in the study" in three minutes is 8.4%. Also, the probabilities at which the user is "(2) eating in the dining space" and at which the user is doing "(5) makeup in the wash room" are respectively 4.0% and 3.1%.

FIG. 16C shows the user activity state predicted in three minutes in a case where the current user activity state is "(4) cooking in the kitchen".

In a case where the current user activity state is "(4) cooking in the kitchen", the probability at which the user is still "(4) cooking in the kitchen" is 22.2%. The probability at which the user is "(1) watching TV in the living room" in three minutes is 38.8%. The probability at which the user is "(2) eating in the dining space" in three minutes is 17.9%. Also, the probabilities at which the user is "(3) thinking in the study" at which the user is doing "(5) makeup in the wash room" are respectively 8.4% and 3.0%.

As described above, according to the user activity prediction unit 16-1, by using the learnt HMM, from the current user activity state, the user activity states after the predetermined time elapses can be predicted as the occurrence probabilities.

Response Processing Learning Processing and Response Processing Selection Processing FIG. 17 shows a part of the learning table created through the learning processing by the response processing learning unit 18-1.

In the learning table, in the respective states of the HMM, a frequency of the response processing performed by the control target apparatus 3 are stored while associating the state ID and the processing ID with each other.

Then, as shown in FIG. 18, in the user activity prediction control processing, it is supposed from the user activity prediction unit 16 that the supplied state ID is "5". In this case, the response processing selection unit 19-1 selects the processing ID with the highest frequency "5" with respect to the state ID "5" and supplies the selected processing ID "5" to the response processing output unit 20-1.

For example, when it is supposed that the state ID "5" is "(1) watching TV in the living room" and the processing ID "5" is "turning ON the TV switch", the response processing selection unit 19-1 supplies a signal instructing "turning ON the TV switch" to the response processing output unit 20-1. When the signal instructing "turning ON the TV switch" is supplied, the response processing output unit 20-1 sends a remote control signal for the instruction of turning ON the power source to the TV.

As described above, according to the first experiment, by using the image data obtained from the wearable sensor 1, the user current state is accurately recognized, and the user state in future after the desired time elapses can be stochastically predicted. Also, in accordance with the prediction results, the external devices can be controlled.

Second Experiment Example

Next, a second experiment example will be described. A structure of the data processing apparatus 2 is similar to FIG. 10, and therefore for the description of the data processing apparatus 2, the reference symbols of the data processing apparatus 2 of FIG. 10 are sited to be described.

According to the second experiment, a GPS receiver is used for the wearable sensor 1. Also, for the control target apparatus 3, for example, a portable small display or speaker is adopted.

The data processing apparatus 2 causes the Ergodic HMM to learn the action of the user, to be more specific, the movement path where the user moves, as the user activity model. Then, the data processing apparatus 2 predicts the destination (position) of the user at a time T+N which is a time after a desired time elapses from the current time T. The data processing apparatus 2 displays information in accordance with the predicted destination on the display. For example, in a case where the predicted destination is a station, the data processing apparatus 2 displays a time table on the display. Also, for example, in a case where the predicted destination includes a shop the user frequently visits the data processing apparatus 2 displays detailed information of the shop (opening hours, sale information, and the like) on the display.

The sensor input unit 11-1 obtains time-series position data output from the GPS receiver functioning as the wearable sensor 1 as the sensor data to be supplied to the preprocessing unit 12-1. The preprocessing unit 12-1 does not perform a preprocessing in the present experiment but outputs the supplied data as it is. However, it is possible to cause the preprocessing unit 12-1 to perform, for example, a low-pass filter processing or a processing of supplementing a route in a tunnel where GPS signals are not received.

Processings by the user activity model learning unit 13-1, the user activity model parameter storage unit 14-1, and the user activity recognition unit 15-1 are similar to those in the first experiment example except that the sensor data (time-series data) of the processing target is the position data, and a description thereof will be omitted.

The user activity prediction unit 16-1 predicts the user activity state at the time T+N after a desired time elapses on the basis of the state ID representing the current user activity state. In the second experiment, the user activity prediction unit 16-1 calculates the occurrence probabilities of the respective states $s_i$ until the time T+N experimentally decided by using random numbers on the basis of the state transition probability $a_{ij}$ while the current user activity state is set as the starting point. That is, the user activity prediction unit 16-1 experiments at least once to decide the state $s_i$ until the time T+N while sequentially deciding which state $s_i$ occurring at a desired time in future T+n (n=1, 2, . . . , N) with random numbers on the basis of the state transition probability $a_{ij}$. Then, as a result of the experiment carried out at least once, the user activity prediction unit 16-1 predicts a state in which the occurrence probability (the number of occurrence times) at the desired time T+N is largest or a state in which the occurrence probability (the number of occurrence times) is equal to or larger than a predetermined threshold as the user activity state at the time T+N.

It should be noted that according to the second experiment too, similarly as in the first experiment example, while it is presumed that the observation probabilities of the respective states $s_i$ at the respective times are an equal probability, it is also possible to predict the user activity state at the time T+N through a method of calculating the occurrence probabilities of the respective states $s_i$ until the time T+N on the basis of the state transition probability $a_{ij}$.

The response processing learning unit 18-1 stores the learning table in which the state ID for the state corresponding to the present location of the user is associated with the processing ID indicating the information to be displayed on the display. Also, the response processing learning unit 18-1 stores information to be displayed on the display which is linked to the processing ID (user presentation information).

The response processing selection unit 19-1 selects (decides) the processing ID corresponding to the state ID supplied from the user activity prediction unit 16 from the learning table and obtains the user presentation information corresponding to the selected processing ID from the response processing learning unit 18-1 to be supplied to the response processing output unit 20-1.

The response processing output unit 20-1 outputs the user presentation information supplied from the response processing selection unit 19-1 to the display or speaker functioning as the control target apparatus 3. The control target apparatus 3 displays the user presentation information on the display or outputs the user presentation information as audio from the speaker.

Figure 19:
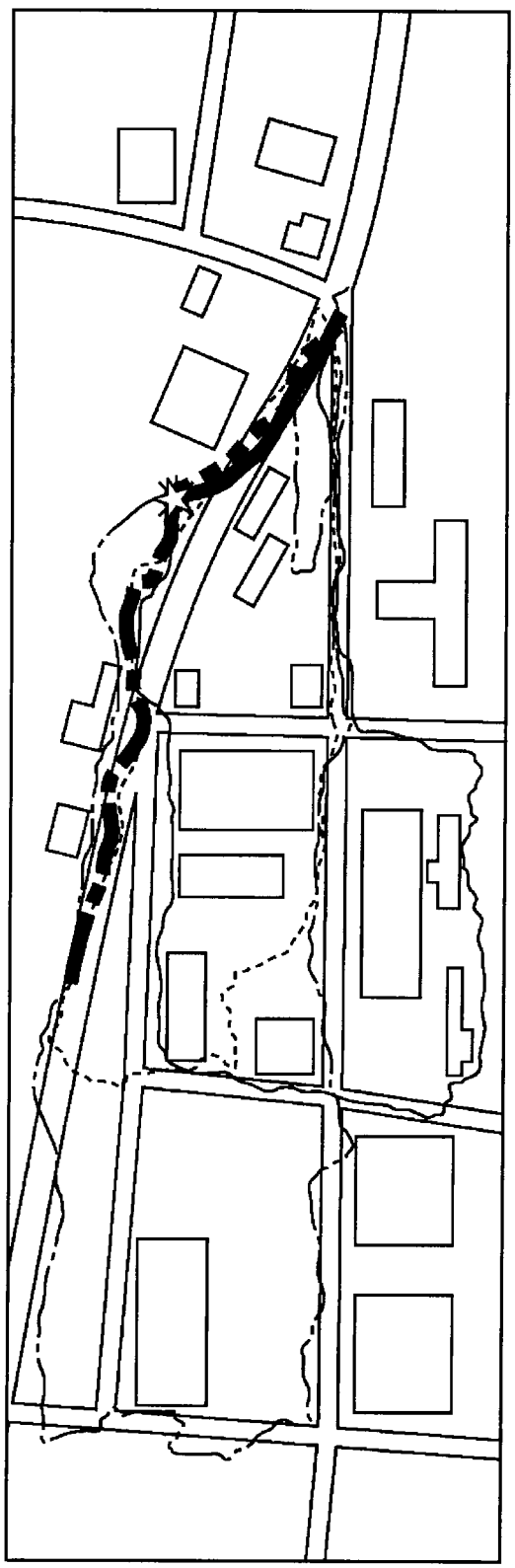
FIG. 19 is an explanatory drawing for describing a recognition result and a prediction result of the data processing apparatus in an experience 2.
Figure 20:
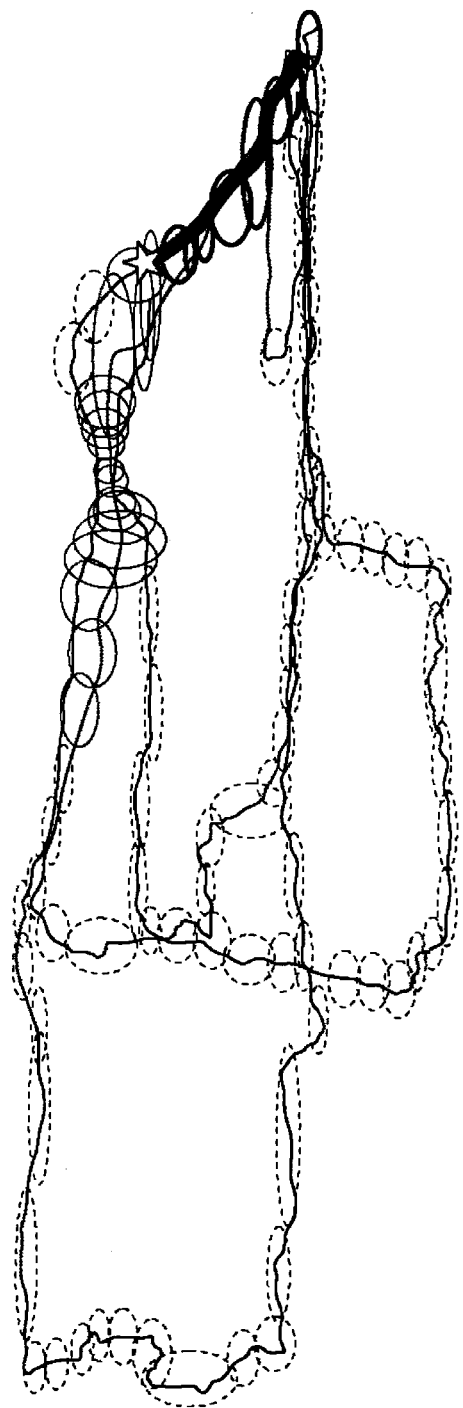
FIG. 20 is an explanatory drawing for describing a recognition result and a prediction result of the data processing apparatus in the experience 2.

FIG. 19 and FIG. 20 show the recognition result and the prediction result of the data processing apparatus 2 in the second experiment.

In FIG. 19, a thin solid line, a dotted line, a dot chain line, and a two-dot chain line illustrated on a map represent movement routes of the user learnt by the data processing apparatus 2.

Also, in FIG. 19, a bold dotted line illustrated on the map represents (time-series data of) a user movement route newly input after the learning, and a star mark represents a present location of the user.

Furthermore, a bold solid line of FIG. 19 represents the recognition result by the user activity recognition unit 15-1, and a bold dot chain line represents the prediction result by the user activity prediction unit 16-1.

On the other hand, in FIG. 20, the respective states $s_i$ learnt by the user activity model learning unit 13-1 are illustrated by dotted elliptic circles. According to FIG. 20, all the movement routes of the user are included in one of the learnt states $s_i$ (dotted elliptic circles), and it is understood that the HMM can accurately learn the movement routes of the user. It should be noted that in the second experiment, the number of states M is set as 100.

Also, in FIG. 20, a bold solid curved line represents (time-series data of) a user movement route newly input after the learning, and in contrast, the respective states $s_i$ recognized by the user activity recognition unit 15-1 are represented by bold solid elliptic circles.

Furthermore, in FIG. 20, a thin solid line represents the prediction result of the movement route (activity state) of the user until the desired time T+N predicted by the user activity prediction unit 16-1.

A thin solid elliptic circle in FIG. 20 corresponds to the bold dot chain line in FIG. 19, and a bold solid elliptic circle in FIG. 20 corresponds to the bold line in FIG. 19. Also, a bold solid curbed line in FIG. 20 corresponds to the bold dotted line in FIG. 19.

According to FIG. 19 and FIG. 20, it is understood that the appropriate state $s_i$ is selected as the prediction result by the user activity prediction unit 16-1. That is, it is understood that the appropriate prediction is carried out.

In the above-mentioned second experiment, by using the position data obtained from the wearable sensor 1, the user current state (present location) is accurately recognized, and also the user state (present location) in future after the desired time elapses can be predicted. Also, in accordance with the prediction results, the external devices are controlled, and it is possible to provide the information to the user.

As described above, according to the data processing apparatus 2 to which the embodiment of the present invention is applied, the current action (state) of the user is accurately recognized as the user activity state, and also it is possible to stochastically predict the activities (states) of the user at a desired time in future as the occurrence probabilities. Then, on the basis of the prediction results, it is possible to control the external apparatuses and present the information to the user.

Up to now, in a case where an intelligent room where electronic devices are automatically controlled in accordance with the action of the user is constructed, various sensors in accordance with purposes are installed in the living room. According to the embodiment of the present invention, when the user puts on the wearable sensor 1, the user activity state can be recognized, predicted, and controlled, and it is therefore possible to construct the intelligent room with a simple configuration.

The above-mentioned series of processings can be executed by hardware but can also be executed by software. In a case where the above-mentioned series of processings is executed by the software, a program structuring the software is installed into a computer. Herein, the computer includes a computer incorporated in dedicated-use hardware, a general-use personal computer or the like which is, for example, capable of executing various functions by installing various programs, and the like.

Figure 21:
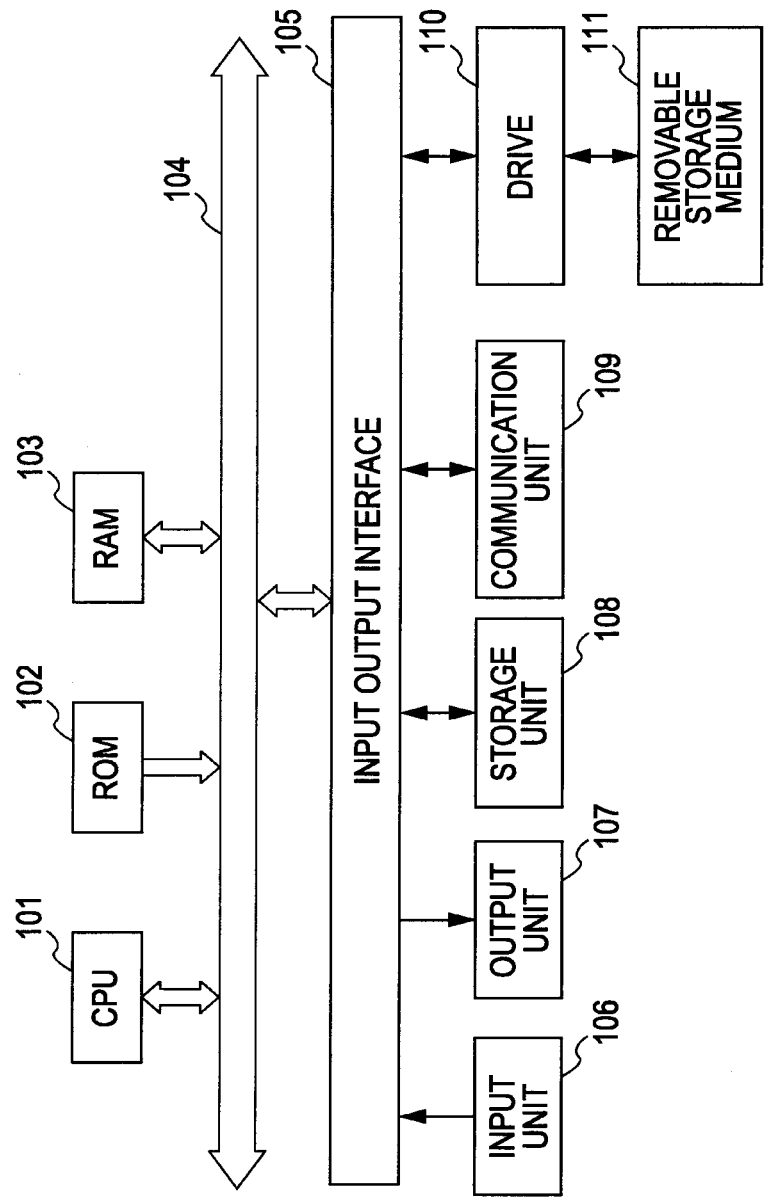
FIG. 21 is a block diagram showing a configuration example of a computer according to an embodiment to which the present invention is applied.

FIG. 21 is a block diagram showing a hardware configuration example of the computer for executing the above-mentioned series of processings by the programs.

In the computer, a CPU (Central Processing Unit) 101, a ROM (Read Only Memory) 102, and a RAM (Random Access Memory) 103 are mutually connected by a bus 104.

Furthermore, an input output interface 105 is connected to the bus 104. An input unit 106, an output unit 107, a storage unit 108, a communication unit 109, and a drive 110 are connected to the input output interface 105.

The input unit 106 is composed of a key board, a mouse, a microphone, or the like. The output unit 107 is composed of a display, a speaker, or the like. The storage unit 108 is composed of a hard disc, a non-volatile memory, or the like. The communication unit 109 is composed of a network interface, or the like. The drive 110 is configured to drive a removable recording medium 111 such as a magnetic disc, an optical disc, an opto-magnetic disc, or a semiconductor memory.

In the computer configured as described above, the above-mentioned series of processings is carried out while the CPU 101 loads a program stored in the storage unit 108, for example, via the input output interface 105 and the bus 104 onto the RAM 103 for the execution.

The program executed by the computer (the CPU 101) can be provided while being recorded for example, on the removable recording medium 111 serving as package media or the like. Also, the program can be provided via a wired or wireless transmission medium such as a local area network, the internet, or digital satellite broadcasting.

In the computer, by mounting the removable recording medium 111 to the drive 110, the program can be installed via the input output interface 105 into the storage unit 108. Also, the program can be received by the communication unit 109 via the wired or wireless transmission medium to be installed into the storage unit 108. In addition to the above, the program can be previously installed in the ROM 102 or the storage unit 108.

It should be noted that the program executed by the computer may be a program in which the processings are performed in a time-series manner in the order described in the present specification or a program in which the processings are performed in parallel or at an appropriate timing when a call is generated, for example.

It should be noted that in the present specification, the steps described in the flow charts may of course be executed in the time-series manner in the stated order, and also the steps may be executed in parallel or at an appropriate timing when the call is generated or the like instead of executing the processings in the time-series manner.

It should be noted that in the present specification, the system represents an entire apparatus structured by a plurality of apparatuses.

The present application contains subject matter related to that disclosed in Japanese Priority Patent Application JP 2009-180780 filed in the Japan Patent Office on Aug. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:
obtaining means configured to obtain time-series data from a wearable sensor;
activity model learning means configured to learn an activity model representing a user activity state as a stochastic state transition model from the obtained time-series data; recognition means configured to recognize a current user activity state by using the activity model of the user obtained by the activity model learning means; and
prediction means configured to predict a user activity state after a predetermined time elapses from a current time from the current user activity state recognized by the recognition means, wherein the prediction means
predicts the user activity state after the predetermined time elapses as an occurrence probability, and
calculates the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

2. The data processing apparatus according to claim 1, wherein the prediction means calculates the occurrence probabilities of the respective states until the predetermined time elapses of the stochastic state transition model decided in an experimental manner with use of random numbers on the basis of the state transition probability of the stochastic state transition model to predict the user activity state.

3. The data processing apparatus according to claim 1, wherein the prediction means predicts one of the activity state whose occurrence probability after the predetermined time elapses is largest and the activity state in which whose occurrence probability after the predetermined time elapses is equal to or larger than a predetermined threshold as the user activity state after the predetermined time elapses.

4. The data processing apparatus according to claim 3, wherein the stochastic state transition model is a stochastic state transition model including a hidden state to which a sparse restriction is imposed.

5. The data processing apparatus according to claim 4, further comprising:
response processing learning means configured to learn a processing of a control target apparatus corresponding to the current user activity state recognized by the recognition means; and
selection means configured to select, on the basis of a learning result of the response processing learning means, the processing of the control target apparatus corresponding to the user activity state after the predetermined time elapses predicted by the prediction means and carry out a control for causing the control target apparatus to perform the selected processing.

6. The data processing apparatus according to claim 5, further comprising: preprocessing means configured to perform a predetermined preprocessing on the obtained time-series data.

7. A data processing method for a data processing apparatus configured to process time-series data, the method is performed by at least one processing device, the method comprising the steps of:
obtaining the time-series data from a wearable sensor;
learning an activity model representing a user activity state as a stochastic state transition model from the obtained time-series data;
recognizing a current user activity state by using the activity model of the user obtained through the learning;
predicting a user activity state after a predetermined time elapses from a current time from the recognized current user activity state;
predicting the user activity state after the predetermined time elapses as an occurrence probability; and
calculating the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

8. A program stored on a non-transitory computer readable medium, when executed by a processor, the program causes a computer to function as:
obtaining means configured to obtain time-series data from a wearable sensor;
activity model learning means configured to learn an activity model representing a user activity state as a stochastic state transition model from the obtained time-series data;
recognition means configured to recognize a current user activity state by using the activity model of the user obtained by the activity model learning means; and
prediction means configured to predict a user activity state after a predetermined time elapses from a current time from the current user activity state recognized by the recognition means, wherein the prediction means
predicts the user activity state after the predetermined time elapses as an occurrence probability, and
calculates the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

9. A data processing apparatus comprising:
an obtaining unit configured to obtain time-series data from a wearable sensor;
an activity model learning unit configured to learn an activity model representing a user activity state as a stochastic state transition model from the obtained time-series data;
a recognition unit configured to recognize a current user activity state by using the activity model of the user obtained by the activity model learning unit; and
a prediction unit configured to predict a user activity state after a predetermined time elapses from a current time from the current user activity state recognized by the recognition unit, wherein the prediction unit is configured to:
predict the user activity state after the predetermined time elapses as an occurrence probability, and
calculate the occurrence probabilities of the respective states after the predetermined time elapses on the basis of the state transition probability of the stochastic state transition model to predict the user activity state after the predetermined time elapses, while it is presumed that observation probabilities of the respective states at the respective times of the stochastic state transition model are an equal probability.

* * * * *